United States Patent
Tian et al.

(10) Patent No.: US 11,384,212 B2
(45) Date of Patent: Jul. 12, 2022

(54) FILMS WITH A PRIMER LAYER CONTAINING SILICA NANOPARTICLES MODIFIED BY AN ORGANIC SILANE

(71) Applicant: 3M INNOVATIVE PROPERTIES COMPANY, St. Paul, MN (US)

(72) Inventors: Xue Tian, Woodbury, MN (US); Naiyong Jing, St. Paul, MN (US); Jun Ma, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 433 days.

(21) Appl. No.: 16/619,267

(22) PCT Filed: Jun. 7, 2018

(86) PCT No.: PCT/IB2018/054129
§ 371 (c)(1),
(2) Date: Dec. 4, 2019

(87) PCT Pub. No.: WO2018/234916
PCT Pub. Date: Dec. 27, 2018

(65) Prior Publication Data
US 2021/0371615 A1  Dec. 2, 2021

Related U.S. Application Data
(60) Provisional application No. 62/523,974, filed on Jun. 23, 2017.

(51) Int. Cl.
| | |
|---|---|
| *C08J 7/056* | (2020.01) |
| *C08J 7/06* | (2006.01) |
| *C08J 7/043* | (2020.01) |
| *C08J 7/046* | (2020.01) |
| *C09D 7/40* | (2018.01) |
| *C09D 7/62* | (2018.01) |
| *C08J 7/04* | (2020.01) |
| *C09D 1/02* | (2006.01) |
| *C09D 4/00* | (2006.01) |
| *C09D 5/00* | (2006.01) |
| *C09D 5/16* | (2006.01) |
| *C08K 3/36* | (2006.01) |

(52) U.S. Cl.
CPC ............ *C08J 7/06* (2013.01); *C08J 7/043* (2020.01); *C08J 7/046* (2020.01); *C08J 7/0423* (2020.01); *C08J 7/056* (2020.01); *C09D 1/02* (2013.01); *C09D 4/00* (2013.01); *C09D 5/002* (2013.01); *C09D 5/1675* (2013.01); *C09D 7/62* (2018.01); *C09D 7/67* (2018.01); *C08J 2367/02* (2013.01); *C08J 2483/04* (2013.01); *C08K 3/36* (2013.01)

(58) Field of Classification Search
CPC .......... C08J 7/0423; C08J 7/043; C08J 7/056
See application file for complete search history.

(56) References Cited

U.S. PATENT DOCUMENTS

| | | | |
|---|---|---|---|
| 2,736,721 | A | 2/1956 | Dexter |
| 2,803,615 | A | 8/1957 | Ahlbrecht |
| RE24,906 | E | 12/1960 | Ulrich |
| 4,152,165 | A | 5/1979 | Langager |
| 4,235,638 | A | 11/1980 | Beck |
| 4,338,377 | A | 7/1982 | Beck |
| 4,806,665 | A | 2/1989 | Jones |
| 4,816,333 | A | 3/1989 | Lange |
| 4,830,773 | A | 5/1989 | Olson |
| 4,833,179 | A | 5/1989 | Young |
| 5,209,971 | A | 5/1993 | Babu |
| 5,244,780 | A | 9/1993 | Strobel |
| 5,461,134 | A | 10/1995 | Leir |
| 5,824,748 | A | 10/1998 | Kesti |
| 5,882,774 | A | 3/1999 | Jonza |
| 5,936,703 | A | 8/1999 | Miyazaki |
| 6,040,053 | A | 3/2000 | Scholz |
| 6,372,323 | B1 | 4/2002 | Kobe |
| 6,375,871 | B1 | 4/2002 | Bentsen |
| 6,696,157 | B1 | 2/2004 | David |
| 6,916,773 | B2 | 7/2005 | Griese |
| 6,991,695 | B2 | 1/2006 | Tait |
| 7,099,083 | B2 | 8/2006 | Johnson |
| 7,371,464 | B2 | 5/2008 | Sherman |
| 8,772,215 | B2 | 7/2014 | Ryther |
| 9,340,683 | B2 | 5/2016 | Jing |
| 2003/0134515 | A1 | 7/2003 | David |
| 2005/0064275 | A1 | 3/2005 | Mekala |
| 2005/0106360 | A1 | 5/2005 | Johnston |
| 2007/0139451 | A1 | 6/2007 | Somasiri |
| 2010/0317559 | A1 | 12/2010 | Ryther |
| 2012/0273000 | A1 | 11/2012 | Jing |
| 2012/0295829 | A1 | 11/2012 | Peitersen |
| 2013/0023458 | A1 | 1/2013 | Hodge |
| 2016/0271997 | A1 | 9/2016 | Berniard |

FOREIGN PATENT DOCUMENTS

| | | |
|---|---|---|
| EP | 2674449 | 12/2013 |
| WO | WO 1995-17303 | 6/1995 |
| WO | WO 1996-34029 | 10/1996 |
| WO | WO 1996-35458 | 11/1996 |
| WO | WO 1999-36248 | 7/1999 |

(Continued)

OTHER PUBLICATIONS

"Zwitterionic compounds/zwitterions", International Union of Pure and Applied Chemistry (IUPAC) Gold Book, [retrieved from the internet on Jan. 21, 2020], URL <http://goldbook.iupac.org/Z06752.html.>, 1 page.

(Continued)

*Primary Examiner* — Marc S Zimmer
(74) *Attorney, Agent, or Firm* — Jean A. Lown

(57) ABSTRACT

A film including: an organic polymeric substrate having a first major surface and a second major surface; an optional acrylic hardcoat layer disposed on the first major surface of the substrate; a siliceous primer layer disposed on the organic polymeric substrate or on the optional acrylic hardcoat layer, wherein the siliceous primer layer includes silica nanoparticles modified by an organic silane; and a superhydrophilic surface layer disposed on the siliceous primer layer, wherein the superhydrophilic surface layer includes hydrophilic-functional groups.

15 Claims, 1 Drawing Sheet

(56) References Cited

FOREIGN PATENT DOCUMENTS

| WO | WO 1999-39224 | 8/1999 |
|---|---|---|
| WO | WO 2007-146680 | 12/2007 |
| WO | WO 2009-119690 | 10/2009 |
| WO | WO 2009-140482 | 11/2009 |
| WO | WO 2011-084661 | 7/2011 |
| WO | WO 2011-163175 | 12/2011 |
| WO | WO 2013-102099 | 7/2013 |
| WO | WO 2015-164468 | 10/2015 |
| WO | WO 2016-044082 | 3/2016 |
| WO | WO 2017-107184 | 6/2017 |
| WO | WO 2017-107185 | 6/2017 |
| WO | WO 2018-236593 | 12/2018 |

OTHER PUBLICATIONS

Bragg, "The Form Birefringence of Marcomolecules", Acta Crystallographica, 1953, vol. 6, pp. 865-867.
Encyclopedia of Polymer Science and Engineering, 1988, vol. 13, 3 pages.
Encyclopedia of Polymer Science and Technology, 1972, vol. 1, 24 pages.
Kirk-Othmer, Encyclopedia of Chemical Technology, 900-912 (1979).
Koppel, "Analysis of Macromolecular Polydispersity in Intensity Correlation Spectroscopy: The Method of Cumulants", Journal of Chemical Physics, Dec. 1972, vol. 57, No. 11, pp. 4814-4820.
Litt, "Siloxane Zwitterions: Synthesis and Surface Properties of Crosslinked Polymers", Journal of Applied Polymer Science, May 1975, vol. 19, No. 5, pp. 1221-1225.
Pujari, "Covalent Surface Modification of Oxide Surfaces", Angewandte Chemie International Edition, 2014, vol. 53, pp. 6322-6356.
Qui, "Development and evaluation of new zwitterionic Hydrophilic interaction liquid chromatography stationary phases based on 3-P,P-diphenylphosphonium-propylsulfonate", Journal of Chromatography A, 2011, vol. 1218, pp. 8075-8082.
International Search Report for PCT International Application No. PCT/IB2018/054129, dated Sep. 13, 2018, 5 pages.

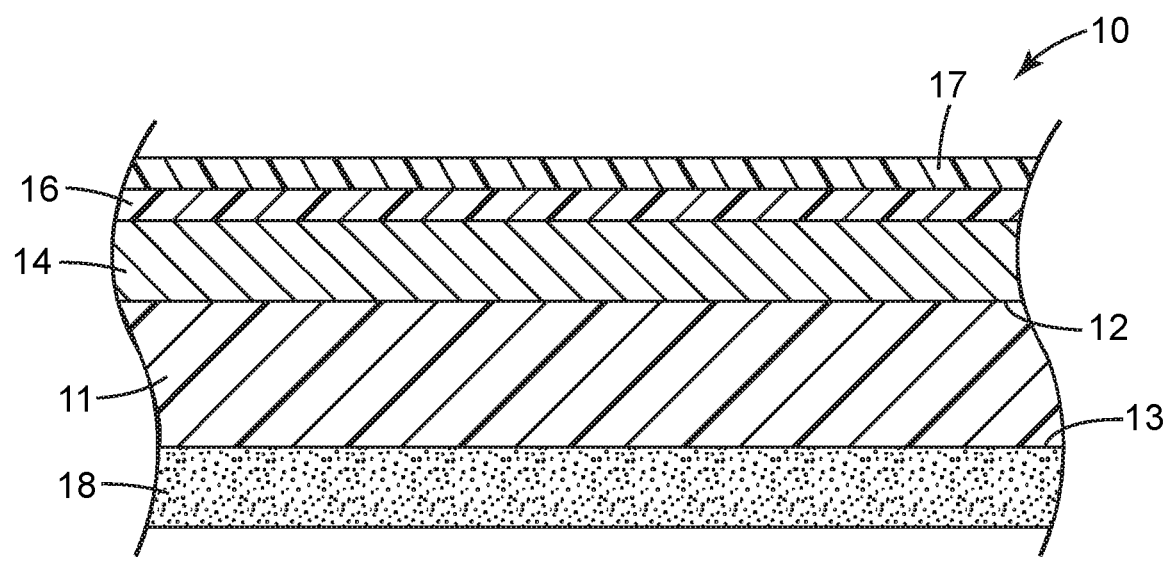

FILMS WITH A PRIMER LAYER CONTAINING SILICA NANOPARTICLES MODIFIED BY AN ORGANIC SILANE

CROSS REFERENCE TO RELATED APPLICATION

This application is a national stage filing under 35 U.S.C. 371 of PCT/IB2018/054129, filed Jun. 7, 2018, claims the benefit of U.S. Provisional Patent Application No. 62/523,974, filed Jun. 23, 2017, the disclosures of which are incorporated by reference herein in their entirety.

BACKGROUND

The ability to control the surface wettability of solid substrates is important for various applications. Highly hydrophilic surfaces (i.e., superhydrophilic surfaces) are known to provide antifogging, easy-clean, and rinse-away properties by allowing water to rapidly spread into a continuous and even water sheet on the surface, thus undercutting and lifting off various contaminants, which are typically hydrophobic. A use for this is on white boards. For example, superhydrophilic surfaces with easy-removal of permanent markers are useful for easy-clean white boards.

For application to a variety of substrates, it is desirable to coat compositions that provide such superhydrophilic surfaces on a polymeric sheet (e.g., a flexible organic polymeric substrate such as polyethylene terephthalate (PET)). The development of durable hydrophilic coatings on such organic polymeric substrates is challenging due to the poor interfacial adhesion between the dissimilar hydrophilic coating materials and hydrophobic substrates. Thus, such hydrophilic protective coatings on hydrophobic substrates are temporary and short-lived. Durability has been increased by using a hardcoat layer with additional treatment (e.g., corona treatment, plasma treatment, or a diamond like glass layer). The preparation of such films, however, involves multi-step processes at high cost. What is needed is a durable film construction with a superhydrophilic surface that can be made efficiently at lower cost.

SUMMARY

The present disclosure provides a film construction having a superhydrophilic surface layer. Specifically, a film is provided that includes: an organic polymeric substrate having a first major surface and a second major surface; an optional acrylic hardcoat layer disposed on the first major surface of the substrate; a siliceous primer layer disposed on the organic polymeric substrate or on the optional acrylic hardcoat layer; and a superhydrophilic surface layer disposed on the siliceous primer layer, wherein the superhydrophilic surface layer includes hydrophilic-functional (e.g., sulfonate-functional) groups. The use of the siliceous primer layer results in the production of a film at lower cost using, for example, conventional techniques, such as roller coater techniques.

The siliceous primer layer includes silica nanoparticles modified by an organic silane. Typically, the nanosilica particles modified by organic silane are present in an amount of 50 weight percent (wt-%) to 90 wt-%, based on the total weight of the primer layer. The silica nanoparticles may be in the form of nonporous spherical nanoparticles.

In certain embodiments, the siliceous primer layer further includes a metal silicate, such as that selected from the group of lithium silicate, sodium silicate, potassium silicate, and combinations thereof. In certain embodiments, the siliceous primer layer further includes a polyvalent metal cation salt, such as a polyvalent metal cation salt including a metal cation having a positive charge of at least +2.

The terms "polymer" and "polymeric material" include, but are not limited to, organic homopolymers, copolymers, such as for example, block, graft, random, and copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C., or in certain embodiments, 22° C. to 25° C.

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

BRIEF DESCRIPTION OF THE DRAWING

FIG. 1 is a cross-sectional representation of an exemplary film construction having a primer layer of the present disclosure (wherein the layers are not necessarily to scale).

DETAILED DESCRIPTION OF ILLUSTRATIVE EMBODIMENTS

The present disclosure provides (as shown in FIG. 1) a superhydrophilic film construction (10) that includes: an organic polymeric substrate (11) having a first major surface (12) and a second major surface (13); an optional acrylic hardcoat layer (14) disposed on the first major surface (12) of the substrate (11); a siliceous primer layer (16) disposed on the organic polymeric substrate (11) (e.g., on the first major surface (12)) or on the optional acrylic hardcoat layer (14)); and a superhydrophilic surface layer (17) disposed on the siliceous primer layer (16), wherein the superhydrophilic surface layer includes hydrophilic-functional groups.

Such superhydrophilic film constructions (10) typically include an adhesive layer (18) on the second major surface (13) of the substrate (11). There is no limitation on the type of adhesive other than for the desired end uses. Exemplary adhesives are pressure sensitive adhesives. Pressure sensitive adhesives useful on the films of the present disclosure can be self-tacky or require the addition of a tackifier. Such materials include, but are not limited to, tackified natural rubbers, tackified synthetic rubbers, tackified styrene block copolymers, self-tacky or tackified acrylate or methacrylate copolymers, self-tacky or tackified poly-a-olefins, and tackified silicones. Examples of suitable pressure sensitive adhesives are described in U.S. Pat. No. Re 24,906 (Ulrich), U.S. Pat. No. 4,833,179 (Young et al.), U.S. Pat. No. 5,209,971 (Babu et al.), U.S. Pat. No. 2,736,721 (Dexter), and U.S. Pat. No. 5,461,134 (Leir et al.), U.S. Pat. No. 7,371,464 (Sherman et al.), and International Publication Nos. WO 96/34029 (Sherman et al.) and 96/35458 (Melancon et al.), for example. Others are described in the Encyclopedia of Polymer Science and Engineering, Vol. 13, Wiley-Interscience Publishers, N Y, 1988, and the Encyclopedia of Polymer Science and Technology, Vol. 1, Interscience Publishers, N Y, 1964.

The superhydrophilic surfaces of films of the present disclosure are capable of being written on with ink from a "permanent" marker and capable of being easily cleaned. Preferably, the films are "durable and ghost free" with no obvious permanent ink residue after being subjected to the Mechanical Durability and Easy-Clean Evaluation Test described in the Examples Section with at least 16 hours of aging at 23° C. to 28° C. and up to 5000 cycles of reciprocating abrasion.

Permanent markers can have many of the same solvents as dry erase markers; however, permanent markers are generally "waterproof" after evaporation of the solvent due to the other components of the permanent markers and are not dry erasable.

Organic Polymeric Substrate

A variety of substrates that include an organic polymer can be used herein. The entire substrate may be made of an organic polymer, or the substrate may have a surface of such organic polymer. Whether just on a surface of a substrate or forming the entire substrate, the organic polymers are more hydrophobic than the superhydrophilic surface. Such organic substrates have a static contact angle of water that is greater than 15°.

Substrates used herein may be of a variety of constructions. For example, a substrate may be flat (e.g., sheet material), curved, or of a complex shape. A substrate may be a polymeric sheet material or a molded article.

Substrates used herein may be opaque or transparent or translucent to visible light. They may be flexible or inflexible. Preferably, the substrate is flexible. For example, a substrate may be a flexible sheet made, for example, using conventional filmmaking techniques such as extrusion of the substrate resin into a sheet and optional uniaxial or biaxial orientation. A typical flexible sheet material has a thickness of at least 25 micrometers (microns) and/or up to 1.25 millimeters (mm).

Illustrative examples of suitable (hydrophobic) substrates include organic polymers such as polyesters (such as polyethylene terephthalate, polybutyleneterephthalate), polycarbonates, allyldiglycolcarbonate, polyacrylates (such as polymethylmethacrylate), polystyrenes, polyvinyl chlorides, polysulfones, polyethersulfones, polyphenylethersulfones, homo-epoxy polymers, epoxy addition polymers with polydiamines or polydithiols, polyolefins (polypropylene, polyethylene, and polyethylene copolymers), fluorinated polymers (such as tetrafluoroethylene/hexafluoropropylene/vinylidene fluoride terpolymer, polyvinylidene fluoride, and polyvinyl fluoride), and cellulose esters (such as cellulose acetates or cellulose butyrates); and combinations thereof, including blends and laminates thereof. A preferred substrate is made of polyethylene terephthalate. Illustrative examples of other suitable (more hydrophilic) substrates include organic polymers such as poly(N-isopropylacrylamide) and copolymers (such as poly(N-isopropylacrylamide-co-butylacrylate) and poly(N-isopropylacrylamide-co-methacrylic acid)), polyacrylamide and copolymers (such as poly(acrylamide-co-acrylic acid)), poly(2-oxazoline) (such as poly(2-methyl-2-oxazoline) and poly(2-ethyl-2-oxazoline)), nylon, poly(acrylic acid) and copolymers (such as poly(acrylic acid-co-maleic acid)), poly(methacrylic acid) copolymers (such as poly(N-isopropylacrylamide-co-methacrylic acid)), polymethacrylates (such as poly(2-hydroxypropyl methacrylate)), poly(ethylene glycol) and copolymers (such as polyethylene-block-poly(ethylene glycol) and poly(ethylene glycol)-block-poly(propylene glycol)-block-poly(ethylene glycol)), poly(vinyl alcohol) and copolymers (such as poly (vinyl alcohol-co-ethylene)), poly(vinyl pyrrolidinone) and copolymers (such as poly(l-vinylpyrrolidone-co-styrene) and poly(l-vinylpyrrolidone-co-vinyl acetate)), maleic anhydride copolymers (such as poly(ethylene-alt-maleic anhydride)), polyether (such as poly(methyl vinyl ether)) and copolymers (such as poly(methyl vinyl ether-alt-maleic acid)).

Substrates may be treated to improve adhesion to an overlying coating, using, e.g., chemical treatment, corona treatment such as air or nitrogen corona, plasma, flame, or actinic radiation.

Substrates may be provided with graphics, such as words or symbols as known in the art.

In some embodiments, the substrate is substantially self-supporting, i.e., sufficiently dimensionally stable to hold its shape as it is moved, used, and otherwise manipulated. In some embodiments, the substrate is supported in some fashion, e.g., with a reinforcing frame, adhered to a supporting surface, etc.

Optional Acrylic Hardcoat

An acrylic hardcoat (referred to herein as the "hardcoat" or "hardcoat layer") can improve the stiffness, dimensional stability, and durability of a film of the present disclosure.

In certain embodiments, the acrylic hardcoat is siloxane-bondable, i.e., capable of forming siloxane bonds with the siliceous primer layer. In such embodiments, prior to bonding to the siliceous primer layer, the acrylic hardcoat includes alkoxysilyl functionality.

The amount of alkoxysilyl-functional monomeric units in a cured acrylic hardcoat layer is at least 1 percent by weight (1 wt-%), or at least 5 wt-%, based on the total weight of the hardcoat layer. The amount of alkoxysilyl-functional monomeric units in a cured acrylic hardcoat layer is up to 30 wt-%, or up to 25 wt-%, based on the total weight the hardcoat layer.

The hardcoat is the reaction product of one or more polymerizable monomers, oligomers and/or polymers. In some embodiments, the hardcoat layer further includes particles or nanoparticles.

Preferably, the polymerizable material comprises a free-radically polymerizable material, such as one or more multifunctional (meth)acrylate monomers and/or oligomers. In certain embodiments, the hardcoat includes the reaction product of a mixture including at least one curable component selected from the group consisting of (meth)acrylate monomers and (meth)acrylate oligomers. The (meth)acrylate monomers/oligomers include multifunctional (meth) acrylates. Acrylate functional groups tend to be favored over (meth)acrylate functional groups.

Suitable multifunctional (meth)acrylates (i.e., crosslinking (meth)acrylate monomers) often contain at least two (meth)acryloyl groups, which are often acryloyl groups. Exemplary such monomers with two (meth)acryloyl groups include 1,2-ethanediol diacrylate, 1,3-propanediol diacrylate, 1,4-butanediol diacrylate, 1,6-hexanediol diacrylate (HDDA), 1,6-hexanediol monoacrylate monomethacrylate, 1,9-nonanediol diacrylate, 1,12-dodecanediol diacrylate, 1,3-butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, and neopentylglycol hydroxypivalate diacrylate modified caprolactone.

Other di(meth)acryl-containing monomers include alkoxylated aliphatic diacrylate, alkoxylated cyclohexane dimethanol diacrylate, alkoxylated hexanediol diacrylate, alkoxylated neopentyl glycol diacrylate, cyclohexanedimethanol diacrylate, ethoxylated bisphenol A diacrylate, hydroxypivalaldehyde modified trimethylolpropane diacrylate, neopentyl glycol diacrylate, propoxylated neopentyl glycol diacrylate, tricyclodecanedimethanol diacrylate.

Exemplary crosslinking monomers with three or four (meth)acryloyl groups include, but are not limited to, trimethylolpropane triacrylate (e.g., commercially available under the tradename TMPTA-N from Cytec Surface Specialties, Smyrna, Ga. and under the tradename SR-351H from Sartomer, Exton, Pa.), pentaerythritol triacrylate (e.g., commercially available under the tradename SR-444 from Sartomer), tris(2-hydroxyethyl)isocyanurate triacrylate (e.g., commercially available under the tradename SR-368 from Sartomer), a mixture of pentaerythritol triacrylate and pentaerythritol tetraacrylate (e.g., commercially available from Cytec Surface Specialties under the tradename PETIA with an approximately 1:1 ratio of tetraacrylate to triacrylate, and under the tradename PETA-K with an approximately 3:1 ratio of tetraacrylate to triacrylate), glycerol triacrylate, ethoxylated triacrylates (e.g., ethoxylated trimethylolpropane triacrylate such as that commercially available from Sartomer Company, Exton, Pa. under the tradename SR-454), propoxylated triacrylates (e.g., propoxylated glyceryl triacrylate, propoxylated trimethylolpropane triacrylate), dipentaerythritol pentaacrylate (e.g., commercially available under the tradename SR-399 from Sartomer), pentaerythritol tetraacrylate (e.g., commercially available under the tradename SR-295 from Sartomer), di-trimethylolpropane tetraacrylate (e.g., commercially available under the tradename SR-355 from Sartomer), ethoxylated pentaerythritol tetraacrylate (e.g., commercially available under the tradename SR-494 from Sartomer), and caprolactone-modified dipentaerythritol hexaacrylate. Oligomeric (meth) acryl monomers such as, for example, urethane acrylates, polyester acrylates, and epoxy acrylates can also be employed.

In certain embodiments, the free-radically polymerizable monomers and/or oligomers include at least 10 wt-% multifunctional (meth)acrylate monomers and/or oligomers, based on the total weight of the polymerizable material (i.e., polymerizable monomers and/or oligomers).

In certain embodiments, the free-radically polymerizable monomers and/or oligomers include up to 100 wt-% multifunctional (meth)acrylate monomers and/or oligomers, based on the total weight of the polymerizable material (i.e., polymerizable monomers and/or oligomers).

Many of these monomers and oligomers can be characterized as having a high glass transition temperature (Tg), meaning that the homopolymer of such monomers or oligomers generally have a glass transition temperature of at least 40° C., at least 50° C., at least 60° C., at least 70° C., at least 80° C., at least 90° C., or at least 100° C. Examples of such high Tg monomers and oligomers include trimethylolpropane triacrylate (commercially available under the tradename TMPTA-N from Cytec Surface Specialties, Smyrna, Ga. and under the tradename SR-351H from Sartomer, Exton, Pa., Tg=62° C.), pentaerythritol triacrylate (commercially available under the tradename SR-444 from Sartomer, Tg=103° C.), tris(2-hydroxyethyl)isocyanurate triacrylate (commercially available under the tradename SR-368 from Sartomer, Tg=272° C.), di-trimethylolpropane tetraacrylate (commercially available under the tradename SR-355 from Sartomer, Tg=98° C.), dipentaerythritol pentaacrylate (commercially available under the tradename SR-399 from Sartomer, Tg=90° C.), and pentaerythritol tetraacrylate (commercially available under the tradename SR-295 from Sartomer, Tg=103° C.). Combinations of high Tg monomers/oligomers may be used if desired.

In some embodiments, the hardcoat may include 0 wt-%, at least 5 wt-%, at least 25 wt-%, or at least 50 wt-%, and typically up to 100 wt-%, of high Tg monomers or oligomers, based on the total weight of the (meth)acrylate monomers and/or oligomers.

In some embodiments, the hardcoat may include at least 5 wt-%, at least 10 wt-%, at least 15 wt-%, or at least 20 wt-%, and typically up to 30 wt-%, of low Tg monomers or oligomers, based on the total weight of the (meth)acrylate monomers and/or oligomers. In this context, low Tg means that the homopolymer of such monomers or oligomers generally has a Tg of less than 25° C., or less than 0° C. Various, low Tg monomers and oligomer are known.

Examples of such low Tg monomers and oligomers include ethoxylated(20) trimethylolpropane triacrylate (commercially available under the tradename SR-415 from Sartomer, Tg=−40° C.), ethoxylated(15) trimethylolpropane triacrylate (commercially available under the tradename SR-9035 from Sartomer, Tg=−32° C.), 2(2-ethoxyethoxy) ethyl acrylate (commercially available under the tradename SR-256 from Sartomer, Tg=−54° C.), polyethylene glycol (400) diacrylate (commercially available under the tradename SR-344 from Sartomer, Tg=−24.6° C.), polyethylene glycol(600) dimethacrylate (commercially available under the tradename SR-252 from Sartomer, Tg=−38.8° C.), methoxy polyethylene glycol(350) monomethacrylate (commercially available under the tradename SR-550 from Sartomer, Tg=−62° C.), propoxylated glyceryl triacrylate (commercially available under the tradename SR-9020 from Sartomer, Tg=18° C.), and ethoxylated pentaerythritol tetraacrylate (commercially available under the tradename SR-494 from Sartomer, Tg=2° C.). Various combinations of low Tg monomers/oligomers may be used, if desired.

The hardcoat composition used to prepare the hardcoat layer typically includes a sufficient amount of high Tg polymerizable materials (and optional nanoparticles or other particles) such that the hardcoat layer is non-tacky and has a Tg well above room temperature. In typical embodiments, the Tg of the hardcoat layer is at least 40° C., at least 50° C., at least 60° C., at least 70° C., at least 80° C., at least 90° C., or at least 100° C.

The hardcoat composition used to prepare the hardcoat layer also includes polymerizable alkoxysilyl-containing ethylenically unsaturated monomers for anchoring the primer layer. Examples of such monomers include those of the following general Formulas (I), (II), and (III):

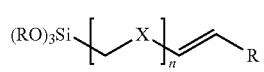

(I)

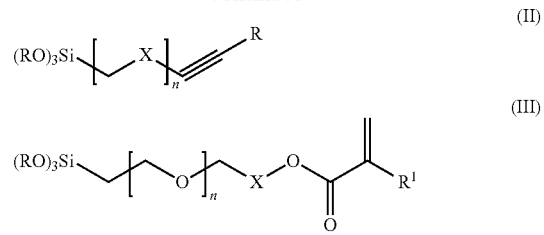

wherein for Formulas (I) and (II):
each R is independently H, —$CH_3$, —$C_2H_5$, —$C_3H_7$, or —$C_4H_9$;
X=$CH_2$ or O; and
n=0 to 10;
wherein for Formula (III):
each R is independently H, —$CH_3$, —$C_2H_5$, —$C_3H_7$, or —$C_4H_9$;
$R^1$ is —$CH_3$ or H;
X=$CH_2$, O, S, or NHC(O)$R^2$;
$R^2$ is independently —$C_2H_5$, —$C_3H_7$, or —$C_4H_9$; and
n=0 to 10.

Examples of suitable polymerizable alkoxysilyl-functional (meth)acrylates include 3-(methacryloyloxy)propyl trimethoxysilane (i.e., 3-(trimethoxysilyl)propyl methacrylate, available under the tradename SILQUEST A174 from Momentive Performance Materials, Waterford, N.Y.), 3-acryloxypropyltrimethoxysilane, 3-(methacryloyloxy) propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, and combinations thereof.

In some embodiments, the polymerizable composition for making the acrylic hardcoat layer includes at least 1 wt-%, or at least 5 wt-%, of polymerizable alkoxysilyl-functional ethylenically unsaturated monomers, based on the total weight of the polymerizable material. In some embodiments, the polymerizable composition for making the acrylic hardcoat layer includes up to 30 wt-%, or up to 25 wt-%, of polymerizable alkoxysilyl-functional ethylenically unsaturated monomers, based on the total weight of the polymerizable material.

Depending on the choice of polymerizable material, the composition may, optionally, contain one or more curatives that assist in polymerizing the polymerizable material. The choice of curative for specific polymerizable materials depends on the chemical nature of the copolymerizable material. For example, in the case of free-radically polymerizable resins, free radical thermal initiators and/or photoinitiators are useful curatives.

Typically, an optional curative is used in an amount effective to facilitate polymerization of the monomers/oligomers and the amount will vary depending upon, for example, the type of curative, the molecular weight of the curative, and the polymerization process. In certain embodiments, an optional curative is included in the composition in an amount of at least 0.01 wt-%, based on the total weight of the composition. In certain embodiments, an optional curative is included in the composition in an amount of up to 10 wt-%, based on the total weight of the composition.

Higher and lower amounts may also be used. Mixtures of curatives may be used if desired.

The hardcoat composition may be cured, for example, by exposure to a thermal source (e.g., heat, infrared radiation), electromagnetic radiation (e.g., ultraviolet and/or visible radiation), and/or particulate radiation (e.g., electron beam of gamma radiation).

Useful free-radical photoinitiators include, for example, benzoin ethers such as benzoin methyl ether and benzoin isopropyl ether, substituted benzoin ethers (e.g., anisoin methyl ether), substituted acetophenones (e.g., 2,2-dimethoxy-2-phenylacetophenone), substituted alpha-ketols (e.g., 2-methyl-2-hydroxypropiophenone), benzophenone derivatives (e.g., benzophenone), and acylphosphine oxides. Exemplary commercially available photoinitiators include photoinitiators under the tradename IRGACURE (e.g., IRGACURE 651, IRGACURE 184, and IRGACURE 819) or DAROCUR (e.g., DAROCUR 1173, DAROCUR 4265) from Ciba Specialty Chemicals, Tarrytown, N.Y., and under the tradename LUCIRIN (e.g., LUCIRIN TPO) from BASF, Parsippany, N.J.

In some embodiments, the acrylic hardcoat includes nanoparticles. Nanoparticles may include a range of particle sizes over a known particle size distribution for a given material. In some embodiments, the average particle size (e.g., particle diameter) is at least 1 nanometer (nm), at least 5 nm, at least 10 nm, or at least 50 nm (i.e., 0.05 micron). In some embodiments, the average particle size (e.g., particle diameter) is up to 60 microns, up to 75 nm, or up to 30 nm. Typical average particle size ranges include from 1 nm to 100 nm, 5 nm to 75 nm, 10 nm to 30 nm, or 0.05 micron to 60 microns. Particle sizes and particle size distributions may be determined in a known manner including, for example, by transmission electron microscopy (TEM). In addition to the foregoing particle sizes, use of smaller and larger average particle sizes are also contemplated.

Illustrative examples of nanoparticles include aluminum oxide, antimony tin oxide, bismuth subsalicylate, boehmite, calcium carbonate, calcium phosphate, cerium dioxide, graphene, halloysite, lanthanum boride, lithium carbonate, silver, antimony oxide, amorphous silica, colloidal silica, silicon dioxide, titanium dioxide, zinc oxide, zirconium oxide or dioxide. Various combinations of such nanoparticles may be used if desired. Suitable nanoparticles can be of many shapes including irregular and regular shapes, nanotubes, nanoplatelets, cylindrical, etc.

Preferred nanoparticles are silica nanoparticles. Silica nanoparticles suitable for use in the acrylic hardcoat are commercially available from Nalco Chemical Co. (Naperville, Ill.) under the product designation NALCO Colloidal Silicas. Suitable silica products include NALCO Products 1040, 1042, 1050, 1060, 2327, and 2329. Suitable fumed silica products include for example, products sold under the tradename AEROSIL series OX-50, -130, -150, and -200 from DeGussa AG (Hanau, Germany), and CAB-O-SPERSE 2095, CAB-O-SPERSE A105, CAB-O-SIL MS from Cabot Corp. (Tuscola, Ill.).

In some embodiments, the nanoparticles are surface-modified nanoparticles. Nanoparticles can be surface modified so that the nanoparticles provide a stable dispersion. "Stable dispersion" refers to a dispersion in which the colloidal nanoparticles do not agglomerate after standing for a period of time, such as about 24 hours, under ambient conditions, e.g., room temperature and atmospheric pressure, without extreme electromagnetic forces. The surface-treatment stabilizes the nanoparticles so that the particles will be well dispersed in a coatable composition and results in a substantially homogeneous composition. Furthermore, the nanoparticles can be modified over at least a portion of its surface with a surface treatment agent so that the stabilized particle can copolymerize or react with the (meth) acrylate monomers or oligomers during curing.

Metal oxide nanoparticles can be treated with a surface treatment agent to make them suitable for use in the acrylic hardcoat of the present invention. In general, a surface treatment agent has a first end that will attach to the particle surface (covalently, ionically or through strong physiosorption) and a second end that imparts compatibility of the particle with the coatable composition and/or reacts with coatable composition during curing. Examples of surface treatment agents include alcohols, amines, carboxylic acids, sulfonic acids, phosphonic acids, silanes, and titanates. The type of treatment agent can depend on the nature of the metal oxide surface. For example, silanes are typically preferred for silica and other siliceous fillers. Surface modification can be accomplished either subsequent to mixing with the coatable composition or after mixing. It may be preferred in the case of silanes to react the silanes with the particle or nanoparticle surface before incorporation into the coatable composition.

The amount of surface modifier can depend on factors such as particle size, particle type, modifier molecular weight, and modifier type. In general, a monolayer of modifier is attached to the surface of the particle. The attachment procedure or reaction conditions required also depend on the surface modifier used. For silanes, surface treatment may take place at elevated temperatures under acidic or basic conditions during a period of 1 hour up to 24 hours.

Surface treatment agents suitable for particles to be included in the acrylic hardcoat include compounds such as, for example, isooctyl trimethoxy-silane, N-(3-triethoxysilylpropyl) methoxyethoxyethoxyethyl carbamate (PEG3TES), SILQUEST A1230, N-(3-triethoxysilylpropyl) methoxyethoxyethoxyethyl carbamate (PEG2TES), 3-(methacryloyloxy)propyl trimethoxysilane (i.e., 3-(trimethoxysilyl)propyl methacrylate, available under the tradename SILQUEST A174 from Momentive Performance Materials, Waterford, N.Y.), 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy) propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate, 2-(2-methoxyethoxy)acetic acid, methoxyphenyl acetic acid, and mixtures of two or more of the foregoing.

Surface modification of the particles in a colloidal dispersion can be accomplished in a number of ways. The process involves the mixture of an inorganic dispersion with surface modifying agents and, optionally, a co-solvent such as, for example, 1-methoxy-2-propanol, ethanol, isopropanol, ethylene glycol, N,N-dimethylacetamide and 1-methyl-2-pyrrolidinone. Co-solvent can be added to enhance the solubility of the surface modifying agents as well as the surface modified particles. The mixture comprising the inorganic sol and surface modifying agents is subsequently reacted at room or an elevated temperature, with or without mixing. In one method, the mixture can be reacted at about 85° C. for about 24 hours, resulting in the surface-modified sol. In one method, where metal oxides are surface-modified, the surface treatment of the metal oxide can involve the adsorption of acidic molecules to the particle surface. The surface modification of the heavy metal oxide preferably takes place at room temperature.

In certain embodiments, at least 50% of the surface area of any individual particles is modified. In other embodiments, all the surface area (100%) of any individual particle is modified.

In some embodiments of the disclosure, at least a portion of the nanoparticles may be surface modified in the manner described above (e.g., at least 80%). In other embodiments, all of the nanoparticles (100%) are surface modified. In still other embodiments, none of the particles are surface modified.

In some embodiments, the nanoparticles are present in an amount of up to 95 wt-%, up to 90 wt-%, up to 80 wt-%, or up to 70 wt-%, based on the total weight of the acrylic hardcoat layer. In some embodiments, the nanoparticles are present in an amount of at least 10 wt-%, at least 20 wt-%, at least 30 wt-%, at least 40 wt-%, or at least 50 wt-%, based on the total weight of the acrylic hardcoat layer.

The polymerizable hardcoat compositions can be formed by dissolving the polymerizable material(s) in a compatible organic solvent and then combined with the nanoparticle dispersion at a concentration of 60 to 70 percent solids. Examples of suitable organic solvents include alcohols (such as methanol, ethanol, and isopropanol), methyl ethyl ketone (MEK), methyl isobutyl ketone (MIBK), ethyl acetate, butyl acetate, and combinations (e.g., mixtures) thereof.

The hardcoat composition can be applied as a single layer or as multiple layers to a substrate using conventional application techniques. Thin films can be applied using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature. Although it is usually convenient for the substrate to be in the form of a roll of continuous web, the coatings may be applied to individual sheets.

In a typical process, the hardcoat composition is dried in an oven to remove the solvent and then cured, for example, by exposure to ultraviolet radiation using an H-bulb or other lamp at a desired wavelength, preferably in an inert atmosphere (less than 50 parts per million oxygen).

In certain embodiments, the thickness of the cured acrylic hardcoat layer is at least 0.5 micron, at least 1 micron, or at least 2 microns. In certain embodiments, the thickness of the acrylic hardcoat layer is no greater than 50 microns, or no greater than 25 microns. In certain embodiments, the thickness ranges from 5 microns to 15 microns.

Primer Layer

The siliceous primer layer of the present disclosure includes nanosilica particles (i.e., ca nanoparticles) modified by an organic silane. In certain embodiments, the siliceous primer layer further includes a metal silicate to densify the porous nanosilica layer and provide enhanced durability. In certain embodiments, the siliceous primer layer further includes a polyvalent metal cation salt to provide further mechanical reinforcement (through, e.g., crosslinking) and corrosion resistance.

In certain embodiments of a dried siliceous primer layer, the nanosilica particles modified by organic silane are present in an amount of at least 50 wt-%, or at least 60 wt-%, based on the total weight of the dried primer layer. In certain embodiments of a dried primer layer, the nanosilica particles modified by organic silane are present in an amount of up to 90 wt-%, or up to 85 wt-%, based on the total weight of the dried primer layer.

In certain embodiments of a dried siliceous primer layer, a metal silicate, such as lithium silicate, sodium silicate, potassium silicate, or combinations thereof, is present in an amount of at least 1 wt-%, or at least 5 wt-%, based on the total weight of the dried primer layer. In certain embodiments of a dried primer layer, a metal silicate is present in an amount of up to 30 wt-%, or up to 20 wt-%, based on the total weight of the dried primer layer.

In certain embodiments of a dried siliceous primer layer, a polyvalent metal cation salt is present in an amount of at least 5 wt-%, or at least 10 wt-%, based on the total weight of the dried primer layer. In certain embodiments of a dried siliceous primer layer, a polyvalent metal cation salt is present in an amount of up to 40 wt-%, or up to 30 wt-%, based on the total weight of the dried primer layer.

In certain embodiments, the silica particles are nonporous spherical nanoparticles. In certain embodiments, the silica particles have an average particle size (e.g., particle diameter) of up to 100 nanometers (nm), up to 80 Mil, or up to 60 nm. That is, the silica particles (e.g., nonporous spherical silica particles) have a volume average particle size (e.g., diameter) (that is, a $D_{50}$) of 100 nm or less, 80 nm or less, or 60 nm or less. In certain embodiments, the silica particles (e.g., nonporous spherical silica particles) have an average particle size (e.g.; diameter) of at least 1 nm, or at least 2 nm. In certain embodiments, nonporous spherical silica particles have a volume average particle diameter in a range of from 2 nm to 60 nm, 1 nm to 20 nm, or 2 nm to 10 nm. The silica particles may have any particle size distribution consistent with the above 100 nm volume average particle diameter; for example, the particle size distribution may be monomodal or polymodal.

Nonporous spherical silica particles in aqueous media (sols) are well known in the art and are available commercially; for example, as silica sols in water or aqueous alcohol solutions under the tradenames LUDOX from E.I. du Pont de Nemours and Co., Wilmington, Del., NYACOL from Nyacol Co. of Ashland, Mass., or NALCO from Nalco Chemical Co. of Naperville, Ill. One useful silica sol with a volume average particle size of 5 nm, a pH of 10.5, and a nominal solids content of 15 wt-%, is available as NALCO 2326 from Nalco Chemical Co. Other useful commercially available silica sols include those available as NALCO 1115 and NALCO 1130 from Nalco Chemical Co., as REMASOL SP30 from Remet Corp, of Utica, N.Y., and as LUDOX SM from E.I. du Pont de Nemours and Co., Wilmington, Del. Still other useful aqueous colloidal silica sols are commercially available from Nissan Chemical America Corp., Houston, Tex., under the tradenames SNOWTEX-XS, SNOWTEX-S, SNOWTEX-20L, SNOWTEX-30, SNOWTEX-40, SNOWTEX-50, SNOWTEX-60, SNOWTEX-OS, SNOWTEX-O, SNOWTEX-040, SNOWTEX-OL, SNOWTEX-N, SNOWTEX-N30G, SNOWTEX-N40, SNOWTEX-NXS, SNOWTEX-NS, SNOWTEX-XL, SNOWTEX-YL, and SNOWTEX-C.

Non-aqueous spherical silica sols are spherical silica sol dispersions wherein the liquid phase is an organic solvent. Typically, the silica sol is chosen so that its liquid phase is compatible with the remaining components of the continuous liquid phase of the primer coating composition. Typically, sodium-stabilized nonporous spherical silica particles should first be acidified prior to dilution with an organic solvent such as ethanol, as dilution prior to acidification may yield poor or non-uniform coatings. Ammonium-stabilized silica nanoparticles may generally be diluted and acidified in any order.

Silica nanoparticles can be treated with a surface treatment agent to make them suitable for use in the primer layer of the present disclosure. In general, a surface treatment agent has a first end that will attach to the particle surface (covalently, ionically or through strong physiosorption) and a second end that imparts compatibility of the particle with the coatable composition and/or reacts with coatable composition during curing. Silanes are examples of surface treatment agents for the silica nanoparticles. Surface modification can be accomplished either subsequent to mixing with the coatable composition or after mixing. It may be preferred in the case of silanes to react the silanes with the nanoparticle surface before incorporation into the coatable composition.

The amount of surface modifier can depend on factors such as particle size, particle type, modifier molecular weight, and modifier type. In general, a monolayer of modifier is attached to the surface of each particle. The attachment procedure or reaction conditions required also depend on the surface modifier used. For silanes, surface treatment may take place at elevated temperatures under acidic or basic conditions during a period of 1 hour up to 24 hours.

The surface modifier is preferably present in an amount of at least 0.5 millimole per 100 grams of solid nanoparticles. In some embodiments, the surface modifier is more preferably present in an amount of at least 30 millimoles per 100 grams of solid nanoparticles, although other amounts may also be used.

Surface treatment agents suitable for silica nanoparticles to be included in the primer layer include organic silanes, particularly epoxy-functional compounds of Formulas (IV), (V), (VI), and (VII):

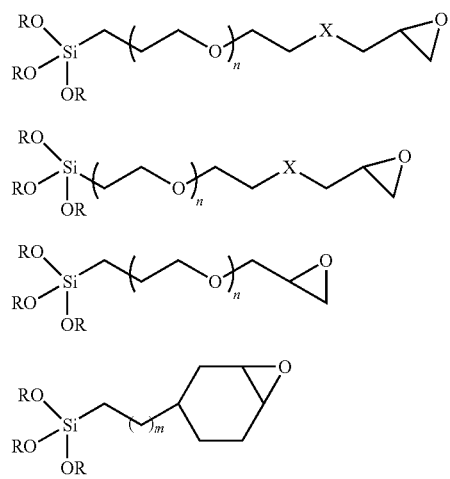

wherein:
each R is independently H, —$CH_3$, —$C_2H_5$, —$C_3H_7$, or —$C_4H_9$;

X=$CH_2$, O, S, or NHC(O)$R^1$;
each $R^1$ is independently —$C_2H_5$, —$C_3H_7$, or —$C_4H_9$;
n=0 to 10; and
m=1 to 4.

Other surface treatment agents suitable for silica nanoparticles to be included in the primer layer include hydroxyl-functional organic silanes, such as the following.

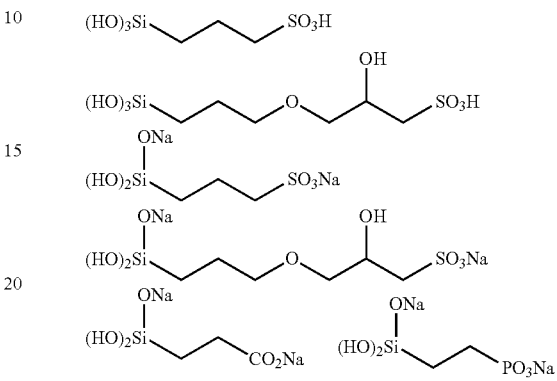

Surface modification of the particles in a colloidal dispersion can be accomplished in a number of ways. The process involves the mixture of an inorganic dispersion with surface modifying agents and, optionally, a co-solvent such as, for example, 1-methoxy-2-propanol, ethanol, isopropanol, ethylene glycol, N,N-dimethylacetamide and 1-methyl-2-pyrrolidinone. Co-solvent can be added to enhance the solubility of the surface modifying agents as well as the surface modified particles. The mixture comprising the inorganic sol and surface modifying agents is subsequently reacted at room or an elevated temperature, with or without mixing. In one method, the mixture can be reacted at 85° C. for 24 hours, resulting in the surface-modified sol. In one method, where silica nanoparticles are surface-modified, the surface treatment can involve the adsorption of acidic molecules to the particle surface. The surface modification preferably takes place at room temperature.

Primer Coating Composition: To facilitate coating, primer coating compositions according to the present disclosure preferably have a pH of 5 or less, or 4 or less, or 3 or less. To facilitate handling, the coating compositions preferably have a pH of at least 1, more preferably at least 2.

Primer coating compositions may be acidified to the desired pH level with an acid having a $pK_a$ of less than 5, preferably less than 2.5, and more preferably less than 1. Useful acids include both organic and inorganic acids such as, for example, oxalic acid, citric acid, benzoic acid, acetic acid, methoxyacetic acid, formic acid, propionic acid, benzenesulfonic acid, $H_2SO_3$, $H_3PO_4$, HCl, I-IBr, HI, $HBrO_3$, $HNO_3$, $HClO_4$, $H_2SO_4$, $CH_3SO_3H$, $CF_3SO_3H$, $CF_3CO_2H$, and $CH_3OSO_3H$. Preferred acids include HCl, $H_2SO_4$, and $H_3PO_4$. Combinations of organic and inorganic acids may also be used. Using weaker acids having a $pK_a$ of greater than 5 may not result in a uniform coating having the desirable properties such as transmissivity, cleanability, and/or durability.

In certain embodiments, nanosilica particles modified by organic silane are included in a primer coating composition in an amount of at least 0.1 wt-%, or at least 0.5 wt-%, based on the total weight of the primer coating composition. In certain embodiments, nanosilica particles modified by organic silane are included in a primer coating composition in an amount of up to 30 wt-%, or up to 10 wt-%, or up to 3 wt-%, based on the total weight of the primer coating composition. Other amounts may also be used in primer coating compositions useful for preparing the siliceous primer layer.

A primer coating composition for preparing the siliceous primer layer further includes a metal silicate, which can provide enhanced durability. Examples of such metal silicates include, for example, lithium silicate, sodium silicate, potassium silicate, or combinations thereof. In certain embodiments, a metal silicate is included in an aqueous primer coating composition in an amount of at least 0.1 wt-%, or at least 1 wt-%, based on the total weight of the primer coating composition. In certain embodiments, a metal silicate is included in an aqueous primer coating composition in an amount of up to 10 wt-%, or up to 2 wt-%, based on the total weight of the primer coating composition.

A primer coating composition for preparing the siliceous primer layer further includes a metal cation salt, wherein the metal cation has a positive charge of at least +2 charge (i.e., a polyvalent metal cation). In some embodiments, the charge of the metal cation is at least +3. Exemplary suitable metal cations include those provided by dissolving salts of polyvalent metals such as aluminum (+3), titanium (+4), vanadium (+3, +4, +5), manganese (+2, +3), zinc (+2), tin (+2, +4), and combinations thereof, in an aqueous vehicle. In some preferred embodiments, these metal cations include aluminum ((+3) cations).

In certain embodiments, a polyvalent metal cation is included in an aqueous primer coating composition in an amount of at least 0.1 wt-%, or at least 0.5 wt-%, based on the total weight of the primer coating composition. In certain embodiments, a polyvalent metal cation is included in an aqueous primer coating composition in an amount of up to 5 wt-%, or up to 3 wt-%, based on the total weight of the primer coating composition.

Primer coating compositions may have a wide range of non-volatile solids content. For example, a primer coating composition may have a solids content of at least 0.1 wt-%, at least 2 wt-%, or at least 3 wt-%, based on the total weight of the primer coating composition. In certain embodiments, a primer coating composition may have a solids content of up to 15 wt-%, up to 10 wt-%, or up to 8 wt-%, based on the total weight of the primer coating composition.

Primer coating compositions include an aqueous continuous liquid phase. Such aqueous continuous liquid phase includes at least 5 wt-% water. In certain embodiments, the aqueous continuous liquid phase may include at least 50 wt-%, at least 60 wt-%, at least 70 wt-%, at least 80 wt-%, or at least 90 wt-%, of water.

While the aqueous continuous liquid phase is preferably essentially free of organic solvents (that is, contains less than 0.1 wt-% of organic solvents, based on the total weight of the aqueous continuous liquid phase), especially volatile organic solvents, organic solvents may optionally be included in a minor amount if desired. If present, the organic solvents should preferably be water-miscible, or at least water-soluble in the amounts in which they are used, although this is not a requirement. Examples of organic solvents include acetone and lower molecular weight ethers and/or alcohols such as methanol, ethanol, isopropanol, n-propanol, glycerin, ethylene glycol, triethylene glycol, propylene glycol, ethylene glycol monomethyl or monoethyl ether, diethylene or dipropylene glycol methyl or ethyl ether, ethylene or propylene glycol dimethyl ether, and triethylene or tripropylene glycol monomethyl or monoethyl ether, n-butanol, isobutanol, s-butanol, t-butanol, and methyl acetate.

Primer coating compositions according to the present disclosure may be made by any suitable mixing technique. One useful technique includes combining an alkaline spherical silica sol of appropriate particle size, a metal silicate and then adjusting the pH to the final desired level and subsequently adding a polyvalent metal cation salt.

Preferably, primer coating compositions according to the present disclosure are stable when stored in liquid form; for example, they do not gel, opacify, form precipitated or agglomerated particulates, or otherwise deteriorate significantly.

Primer coating compositions are preferably coated on a substrate having an acrylic hardcoat disposed thereon using conventional coating techniques, such as brush, bar, roll, wipe, curtain, rotogravure, spray, or dip coating techniques. For ease and simplicity, a preferred method is to wipe the coating composition using a suitable woven or nonwoven cloth, sponge, or foam. Such application materials are preferably acid-resistant and may be hydrophilic or hydrophobic in nature, preferably hydrophilic. Another method to control final thickness and resultant appearance is to apply the coating composition using any suitable method and, after allowing a portion of the solvent to evaporate, to rinse off excess coating composition with a stream of water, while the substrate is still fully or substantially wetted with the composition.

In certain embodiments, primer coating compositions according to the present disclosure are applied to an acrylic hardcoat on a substrate (or directly on a substrate) in a uniform average wet thickness of at least 0.5 micron, or at least 1 micron. In certain embodiments, primer coating compositions according to the present disclosure are applied to an acrylic hardcoat on a substrate (or directly on a substrate) in a uniform average wet thickness of up to 50 microns, or up to 10 microns. Such thicknesses typically avoid visible interference color variations in the primer layer, although other thicknesses may also be used.

The optimal average dry primer layer thickness is dependent upon the particular composition that is coated, but in general the average thickness of the dry primer layer is at least 0.05 micron. In certain embodiments, the average thickness of the dry primer layer is up to 5 microns, or up to 1 micron. Such thicknesses can be estimated, for example, from atomic force microscopy and/or surface profilometry. Above this range, the dry primer layer thickness variations typically cause optical interference effects, leading to visible iridescence (rainbow effect) of the dried coating which is particularly apparent on darker substrates. Below this range the dry primer layer thickness may be inadequate to confer sufficient durability when exposed to environmental wear.

After coating the surface of the substrate, the resultant article is typically dried at ambient or warm temperatures without the need for high temperature heat, radiation, or other curing method. Although higher temperature may increase the speed of the drying process, such temperatures are usually not practical or convenient and care must be exercised to avoid damage to the substrate.

Superhydrophilic Surface Layer

A superhydrophilic surface is defined as having a static contact angle of water of 15° or less. Suitable superhydrophilic surface layers (i.e., "topcoats" or "topcoat layers") are prepared from hydrophilic-functional coating compositions that include one or more hydrophilic-functional compounds. The hydrophilic groups render hydrophilicity to the surface.

Suitable hydrophilic functional groups include sulfonate groups, phosphate groups, phosphonic groups, carboxylate groups, gluconamide-containing groups, sugar-containing groups, polyvinyl alcohol-containing groups, and quaternary ammonium groups. In certain embodiments, the superhydrophilic surface layer includes hydrophilic groups selected from sulfonate groups ($-SO_3^-$), phosphate groups ($-OPO_3H^-$), phosphonic groups ($-PO_3H^-$), and carboxylate groups ($-CO_2^-$). In certain embodiments, the superhydrophilic surface layer includes sulfonate groups (i.e., sulfonate functionality).

These compounds also have alkoxysilane- and/or silanol-functional groups for bonding to an underlying primer layer. For certain embodiments, the hydrophilic-containing compounds are zwitterionic and for certain embodiments, they are non-zwitterionic.

A superhydrophilic layer includes an oligomeric and/or polymeric siloxane network (Si—O—Si) with hydrophilic functional groups pendant therefrom (e.g., sulfonate groups). The amount of hydrophilic functional compounds used to make a cured superhydrophilic surface layer is at least 12 molar-% or at least 25 weight-%, based on the entire amount of the resultant cured superhydrophilic surface layer. The amount of hydrophilic functional compounds used to make a cured superhydrophilic surface layer is up to 100 molar-%, based on the entire amount of the resultant cured superhydrophilic surface layer.

In certain embodiments, the non-zwitterionic compounds used in the coating compositions for the superhydrophilic surface layer of the present disclosure have the following Formulas (VIII), (IX), (X), and (XI):

   (VIII)

   (IX)

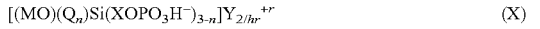   (X)

   (XI)

wherein:
  each Q is independently selected from hydroxyl, alkyl groups containing from 1 to 4 carbon atoms, and alkoxy groups containing from 1 to 4 carbon atoms;
  M is selected from hydrogen, alkyl groups containing from 1 to 4 carbon atoms, alkali metals, and organic cations of strong organic bases having an average molecular weight of less than 150 and a pKa of greater than 11;
  X is an organic linking group;
  Y is selected from hydrogen, alkaline earth metals (e.g., magnesium, calcium, etc.), organic cations of protonated weak bases having an average molecular weight of less than 200 and a pKa of less than 11 (e.g., 4-aminopyridine, 2-methoxyethylamine, benzylamine, 2,4-dimethylimidazole, 3-[2-ethoxy(2-ethoxyethoxy)]propylamine), alkali metals, and organic cations of strong organic bases having an average molecular weight of less than 150 and a pKa of greater than 11 (e.g., $^+N(CH_3)_4$, $^+N(CH_2CH_3)_4$), provided that M is hydrogen when Y is selected from hydrogen, alkaline earth metals, and organic cations of said protonated weak bases;
  r is equal to the valence of Y; and
  n is 1 or 2.

Preferably, the non-zwitterionic compounds of Formulas (VIII), (IX), (X), and (XI) are alkoxysilane compounds (e.g., wherein Q is an alkoxy group containing from 1 to 4 carbon atoms).

In certain embodiments, the weight percentage of oxygen in compounds of Formulas (VIII), (IX), (X), and (XI) is at least 20%, at least 25%, at least 30%, at least 35%, at least 40%, or at least 45%. In certain embodiments, the weight percentage of oxygen in compounds of Formulas (VIII), (IX), (X), and (XI) is up to 55%. In certain embodiments, the range of oxygen in compounds of Formulas (VIII), (IX), (X), and (XI) is 45% to 55%. The weight percentage of silicon in compounds of Formulas (VIII), (IX), (X), and (XI) is no greater than 15%. Each of these percentages is based on the weight of the compound in the water-free acid form.

The organic linking group X of Formulas (VIII), (IX), (X), and (XI) is preferably selected from alkylene groups, cycloalkylene groups, alkyl-substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups, and substituted alkylarylene groups. Most preferably X is selected from alkylene groups, hydroxy-substituted alkylene groups, and hydroxy-substituted mono-oxa alkylene groups.

Suitable examples of non-zwitterionic compounds of Formula (VIII) are described in U.S. Pat. No. 4,152,165 (Langager et al.) and 4,338,377 (Beck et al.), and include, for example, the following:

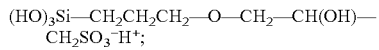

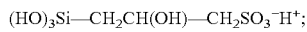

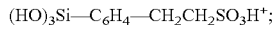

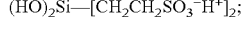

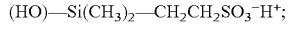

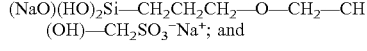

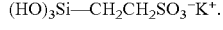

In certain embodiments, the zwitterionic sulfonate, phosphate, phosphonic, or carboxylate organosilanol compounds have the following Formulas (XII), (XIII), (XIV), or (XV):

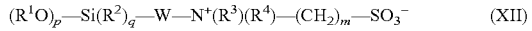   (XII)

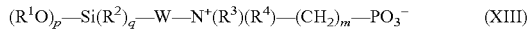   (XIII)

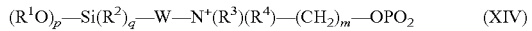   (XIV)

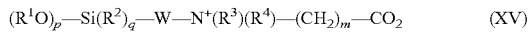   (XV)

wherein:
  each $R^1$ is independently a hydrogen, methyl group, or ethyl group;
  each $R^2$ is independently a methyl group or an ethyl group;
  each $R^3$ and $R^4$ is independently a saturated or unsaturated, straight chain, branched, or cyclic organic group, which may be joined together, optionally with atoms of the group W, to form a ring;
  W is an organic linking group;
  p and m are integers of 1 to 4;
  q is 0 or 1; and
  p+=3.

The organic linking group W of Formulas (XII), (XIII), (XIV), and (XV) is preferably selected from saturated or unsaturated, straight chain, branched, or cyclic organic groups. The linking group W is preferably an alkylene group, which may include carbonyl groups, urethane groups, urea groups, heteroatoms such as oxygen, nitrogen, and sulfur, and combinations thereof. Examples of suitable linking groups W include alkylene groups, cycloalkylene groups, alkyl-substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups, and substituted alkylarylene groups.

Suitable examples of zwitterionic compounds of Formula (XII) are described in U.S. Pat. No. 5,936,703 (Miyazaki et al.) and International Publication Nos. WO 2007/146680 (Schlenoff) and WO 2009/119690 (Yamazaki et al.), and include the following zwitterionic functional groups $(-W-N^+(R^3)(R^4)-(CH_2)_m-SO_3^-)$.

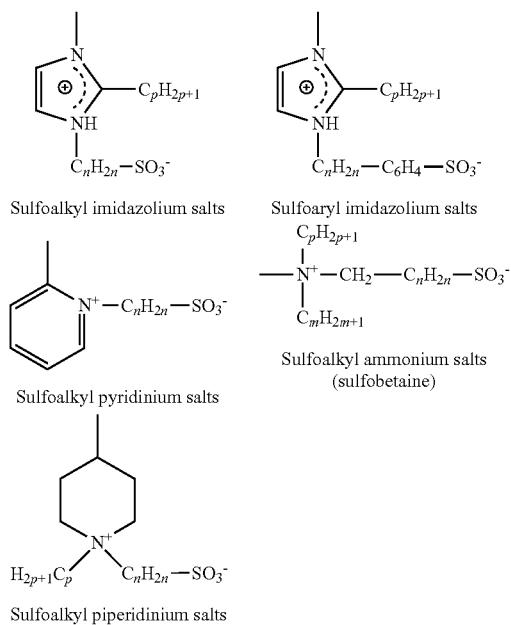

In certain embodiments, the zwitterionic sulfonate-organosilanol compounds used in coating compositions for the superhydrophilic surface layer of the present disclosure have the following Formula (XVI):

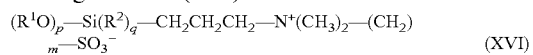

(XVI)

wherein:
each $R^1$ is independently a hydrogen, methyl group, or ethyl group;
each $R^2$ is independently a methyl group or an ethyl group;
p and m are integers of 1 to 4;
q is 0 or 1; and
p+q=3.

Suitable examples of zwitterionic compounds of Formula (XVI) are described in U.S. Pat. No. 5,936,703 (Miyazaki et al.), including, for example:

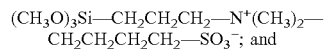

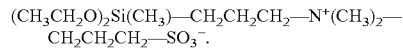

Other examples of suitable zwitterionic compounds, which can be made using standard techniques include the following:

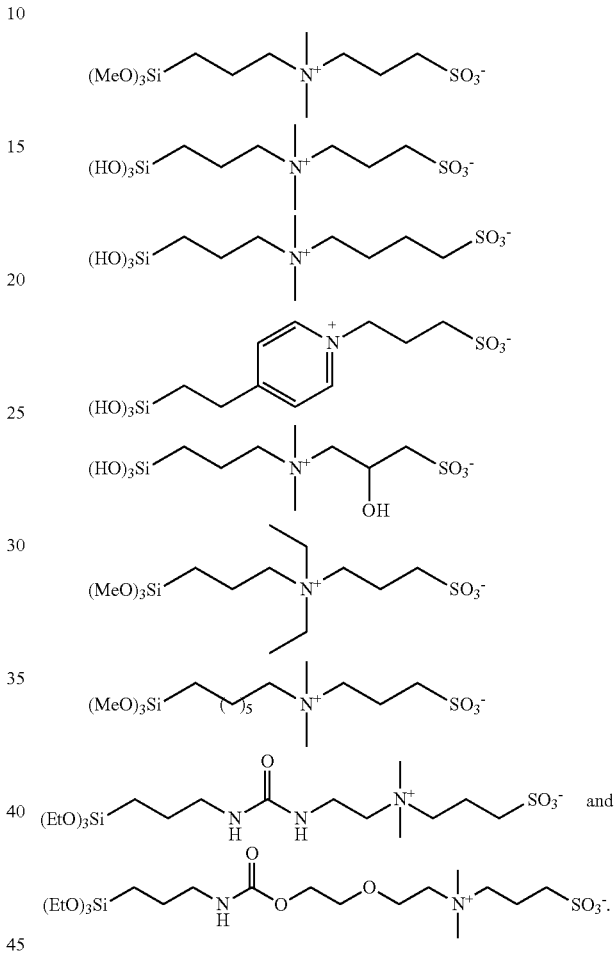

In general, these hydrophilic-functional compounds behave similarly in imparting surfaces with high hydrophilicity, rinse-away, and easy-to-clean performance. In specific applications, however, sulfonate-functional compounds, particularly zwitterionic sulfonate-functional compounds, are more advantageous than other hydrophilic-functional compounds because the sulfonates are less likely to complex with inorganic or organic ammonium cations, including antimicrobial or cationic surfactants. Thus, the protected surfaces are less likely to be contaminated by these cationic species.

The coating compositions for the superhydrophilic surface layer are referred to herein as "superhydrophilic surface coating compositions." They typically include one or more hydrophilic-functional compounds (e.g., sulfonate-functional compounds) in an amount of at least 0.1 wt-%, and often at least 1 wt-%, based on the total weight of the coating composition. Hydrophilic-functional coating compositions typically include one or more hydrophilic-functional compounds (e.g., sulfonate-functional compounds) in an amount of no greater than 20 wt-%, and often no greater than 5 wt-%, based on the total weight of the coating composition. Generally, for monolayer coating thicknesses, relatively dilute coating compositions are used. Alternatively, relatively concentrated coating compositions can be used and subsequently rinsed.

Superhydrophilic surface coating compositions preferably include alcohol, water, or hydroalcoholic solutions (i.e., alcohol and/or water) as a diluent. Typically, such alcohols are lower alcohols (e.g., C1 to C8 alcohols, and more typically C1 to C4 alcohols), such as methanol, ethanol, propanol, 2-propanol, etc. Preferably, hydrophilic-functional coating compositions are aqueous compositions, typically aqueous solutions. As it is used herein, the term "aqueous composition" (e.g., "aqueous solution") refers to compositions (e.g., solutions) containing water. Such compositions may employ water as the only diluent or they may employ combinations of water and organic solvents such as alcohol and acetone. Organic solvents may also be included in the hydrophilic treatment compositions so as to improve their freeze-thaw stability. Alternatively, the diluent in a coating composition can be 100% organic solvent(s) (i.e., no water). In certain embodiments, a diluent is present in an amount of up to 98 wt-%, or up to 50 wt-%, based on the total weight of the coating composition. In certain embodiments, a diluent is present in an amount of at least 2 wt-%, based on the total weight of the coating composition. In certain embodiments, a diluent is present in a range of 2 wt-% to 50 wt-%, based on the total weight of the coating composition.

Superhydrophilic surface coating compositions can be acidic, basic, or neutral. The performance durability of the coatings can be affected by pH. For example, coating compositions containing sulfonate-functional zwitterionic compounds are preferably neutral.

Superhydrophilic surface coating compositions may be provided in a variety of viscosities. Thus, for example, the viscosity may vary from a water-like thinness to a paste-like heaviness. They may also be provided in the form of gels. Additionally, a variety of other ingredients may be incorporated in the compositions.

In certain embodiments, superhydrophilic surface coating compositions may further include a coupling agent such as a tetraalkoxysilane compound (e.g., tetraethylorthosilicate (TEOS)), oligomers of such compounds (e.g., alkyl polysilicates such as poly(diethoxysiloxane)), lithium silicate, sodium silicate, potassium silicate, silica (e.g., silica particles), or combinations thereof, which can provide enhanced durability. Such coupling agents can function in several ways. They can strengthen the bonding within the oligomeric/polymeric siloxane network. They can also improve the interfacial bonding between the superhydrophilic surface layer and the underlying surface. In some embodiments, the amount of such coupling agent included in the coating composition should be limited in order to prevent destruction of anti-fog properties and/or easy cleanability (e.g., rinse-away properties) of the coating. The optimal amount of coupling agent is determined experimentally and is dependent on the coupling agent's identity, molecular weight, and refractive index. The coupling agent(s), when present, are typically added to the coating composition at levels of at least 0.1 wt-%, or at least 1 wt-%, based on the total weight of the coating composition. The coupling agent(s), when present, are typically added to the coating composition at levels of up to 20 wt-%, or up to 15 wt-%, based on the total weight of the coating composition.

Superhydrophilic surface coating compositions (i.e., hydrophilic-functional coating compositions) are preferably coated using conventional techniques, such as bar, roll, curtain, rotogravure, spray, or dip coating techniques. The preferred methods include bar and roll coating, or air knife coating to adjust thickness.

Superhydrophilic surface coating compositions of the present disclosure are preferably applied in a monolayer thickness. Typically, a resultant superhydrophilic surface layer is no greater than 10 microns thick, and preferably no greater than 1 micron thick, as measured using an ellipsometer such as a Gaertner Scientific Corp Model No. L115C.

Once coated, superhydrophilic surface coating compositions are typically dried at temperatures of 20° C. to 200° C. using, for example, a recirculating oven. An inert gas may be circulated. The temperature may be increased further to speed the drying process, but care must be exercised to avoid damage to the substrate.

Superhydrophilic surface layers prepared from superhydrophilic surface coating compositions provide anti-fog properties and easy cleanability (e.g., rinse-away cleaning properties) to surfaces coated therewith. The anti-fog property is demonstrated by the tendency of the coatings to resist the formation of water droplets which tend to significantly reduce the transparency of the coated substrate. Water vapor from, for example, human breathing, tends to condense upon the coated substrate in the form of a thin uniform water film, rather than as water droplets. Such a uniform film does not significantly reduce the clarity or transparency of the substrate.

Illustrative Embodiments

Embodiment 1 is a film comprising: an organic polymeric substrate having a first major surface and a second major surface; an optional acrylic hardcoat layer disposed on the first major surface of the substrate; a siliceous primer layer disposed on the organic polymeric substrate or on the optional acrylic hardcoat layer; and a superhydrophilic surface layer disposed on the siliceous primer layer, wherein the superhydrophilic surface layer comprises hydrophilic-functional groups. Preferred films include an acrylic hardcoat layer.

Embodiment 2 is the film of embodiment 1 wherein the organic polymeric substrate is a flexible sheet material.

Embodiment 3 is the film of embodiment 1 or 2 wherein the superhydrophilic surface layer is no greater than 10 microns thick.

Embodiment 4 is the film of any one of embodiments 1 to 3 wherein the superhydrophilic surface layer is prepared from a coating composition comprising one or more hydrophilic-functional compounds comprising one or more sulfonate groups, phosphate groups, phosphonic groups, carboxylate groups, gluconamide-containing groups, sugar-containing groups, polyvinyl alcohol-containing groups, or quaternary ammonium groups, and further comprise alkoxysilane- and/or silanol-functional groups. In certain embodiments, the superhydrophilic surface layer is prepared from a coating composition comprising one or more hydrophilic-functional compounds comprising one or more sulfonate groups, phosphate, phosphonic, and carboxylate groups.

Embodiment 5 is the film of embodiment 4 wherein the hydrophilic-functional compounds further comprise alkoxysilane- and/or silanol-functional groups.

Embodiment 6 is the film of embodiment 4 or 5 wherein the hydrophilic-functional compounds are non-zwitterionic.

Embodiment 7 is the film of embodiment 6 wherein the non-zwitterionic compounds are hydrophilic-functional compounds of Formulas (VIII), (IX), (X), and (XI):

  (VIII)

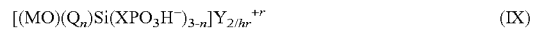  (IX)

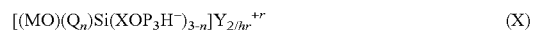  (X)

  (XI)

wherein:

each Q is independently selected from hydroxyl, alkyl groups containing from 1 to 4 carbon atoms, and alkoxy groups containing from 1 to 4 carbon atoms;

M is selected from hydrogen, alkyl groups containing from 1 to 4 carbon atoms, alkali metals, and organic cations of strong organic bases having an average molecular weight of less than 150 and a pKa of greater than 11;

X is an organic linking group;

Y is selected from hydrogen, alkaline earth metals (e.g., magnesium, calcium, etc.), organic cations of protonated weak bases having an average molecular weight of less than 200 and a pKa of less than 11 (e.g., 4-aminopyridine, 2-methoxyethylamine, benzylamine, 2,4-dimethylimidazole, 3-[2-ethoxy(2-ethoxyethoxy)]propylamine), alkali metals, and organic cations of strong organic bases having an average molecular weight of less than 150 and a pKa of greater than 11 (e.g., $^+N(CH_3)_4$, $^+N(CH_2CH_3)_4$), provided that M is hydrogen when Y is selected from hydrogen, alkaline earth metals, and organic cations of said protonated weak bases;

r is equal to the valence of Y; and n is 1 or 2.

Embodiment 8 is the film of embodiment 7 wherein the non-zwitterionic compound is of Formula (VIII).

Embodiment 9 is the film of embodiment 7 or 8 wherein the organic linking group X is selected from alkylene groups, cycloalkylene groups, alkyl-substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups, and substituted alkylarylene groups.

Embodiment 10 is the film of embodiment 4 or 5 wherein the hydrophilic-functional compounds are zwitterionic.

Embodiment 11 is the film of embodiment 10 wherein the zwitterionic compounds are hydrophilic-functional compounds of Formulas (XII), (XIII), (XIV), and (XV):

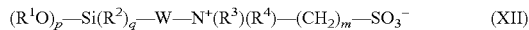

(XII)

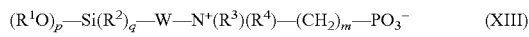

(XIII)

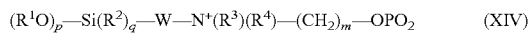

(XIV)

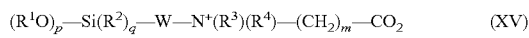

(XV)

wherein:

each $R^1$ is independently a hydrogen, methyl group, or ethyl group;

each $R^2$ is independently a methyl group or an ethyl group;

each $R^3$ and $R^4$ is independently a saturated or unsaturated, straight chain, branched, or cyclic organic group, which may be joined together, optionally with atoms of the group W, to form a ring;

W is an organic linking group;

p and m are integers of 1 to 4;

q is 0 or 1; and p+=3.

Embodiment 12 is the film of embodiment 11 wherein the zwitterionic compound is of Formula (XII).

Embodiment 13 is the film of embodiment 12 wherein the organic linking group W is selected from saturated or unsaturated, straight chain, branched, or cyclic organic groups. In certain embodiments, the linking group W is an alkylene group, which may include carbonyl groups, urethane groups, urea groups, heteroatoms such as oxygen, nitrogen, and sulfur, and combinations thereof.

Embodiment 14 is the film of any one of embodiments 10 to 13 wherein the zwitterionic compounds comprise a zwitterionic functional group

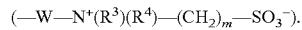

Embodiment 15 is the film of embodiment 14 wherein the zwitterionic functional groups are selected from one of the following.

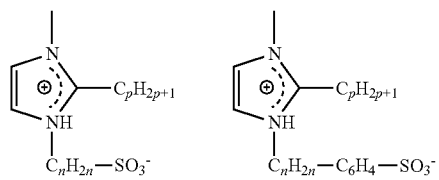

Sulfoalkyl imidazolium salts   Sulfoaryl imidazolium salts

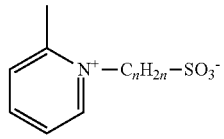

Sulfoalkyl pyridinium salts

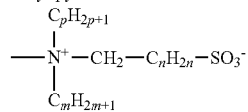

Sulfoalkyl ammonium salts (sulfobetaine)

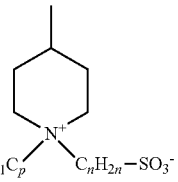

Sulfoalkyl piperidinium salts

Embodiment 16 is the film of embodiment 10 wherein the zwitterionic compounds are sulfonate-organosilanol compounds of Formula (XVI):

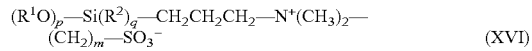

(XVI)

wherein:

each $R^1$ is independently a hydrogen, methyl group, or ethyl group;

each $R^2$ is independently a methyl group or an ethyl group;

p and m are integers of 1 to 4;

q is 0 or 1; and p+=3.

Embodiment 17 is the film of embodiment 10 wherein the zwitterionic compounds are selected from:

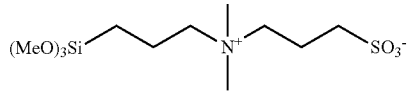

-continued

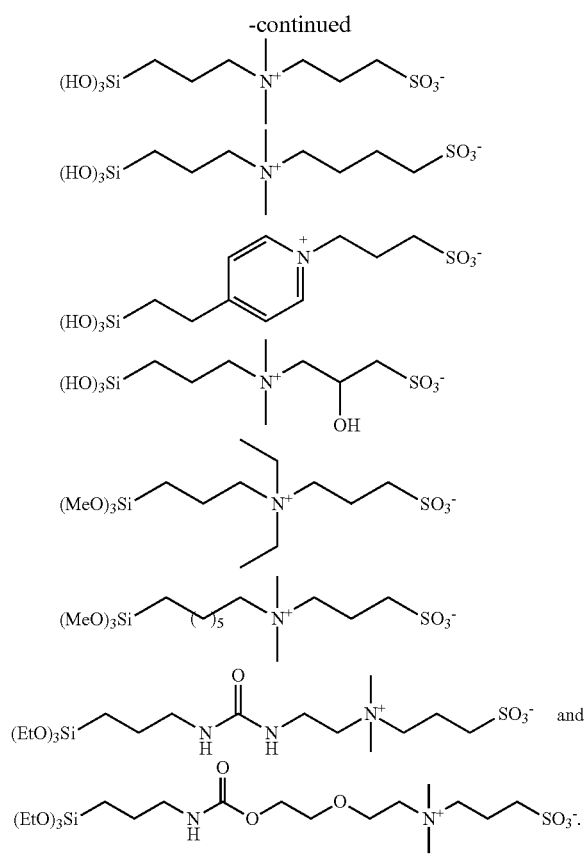

Embodiment 18 is the film of any one of embodiments 4 to 17 wherein the superhydrophilic surface layer is prepared from an aqueous coating composition comprising one or more hydrophilic-functional compounds in an amount of at least 0.1 wt-%, and no greater than 20 wt-%, based on the total weight of the coating composition.

Embodiment 19 is the film of any one of embodiments 4 to 18 wherein the superhydrophilic surface layer is prepared from a coating composition further comprising a coupling agent selected from the group of a tetraalkoxysilane compound, an oligomer of a tetraalkoxysilane compound, lithium silicate, sodium silicate, potassium silicate, silica, and combinations thereof, which can provide enhanced durability.

Embodiment 20 is the film of embodiment 19 wherein the coupling agent is present in the coating composition for the superhydrophilic surface layer in an amount of 0.1 wt-% to 20 wt-%, based on the total weight of the coating composition.

Embodiment 21 is the film of any one of embodiments 2 to 20 wherein the acrylic hardcoat comprises alkoxysilyl groups.

Embodiment 22 is the film of embodiment 21 wherein the hardcoat layer is non-tacky and has a Tg of at least 40° C.

Embodiment 23 is the film of any one of embodiments 2 to 22 wherein the acrylic hardcoat layer has a thickness of at least 0.5 micron and no greater than 50 microns.

Embodiment 24 is the film of any one of embodiments 2 to 23 wherein the acrylic hardcoat layer is prepared from free-radically polymerizable monomers and/or oligomers.

Embodiment 25 is the film of embodiment 24 wherein the free-radically polymerizable monomers and/or oligomers comprise multifunctional (meth)acrylate monomers and/or oligomers.

Embodiment 26 is the film of embodiment 25 wherein the free-radically polymerizable monomers and/or oligomers comprise 10 wt-% to 100 wt-% multifunctional (meth)acrylate monomers and/or oligomers, based on the total weight of the polymerizable material.

Embodiment 27 is the film of embodiment 25 or 26 wherein the multifunctional (meth)acrylate monomers and/or oligomers comprise 5 wt-% to 100 wt-% multifunctional (meth)acrylate monomers and/or oligomers having a Tg of at least 40° C., based on the total weight of the (meth)acrylate monomers and/or oligomers.

Embodiment 28 is the film of embodiment 27 wherein the multifunctional (meth)acrylate monomers and/or oligomers having a Tg of at least 40° C. comprise trimethylolpropane triacrylate, pentaerythritol triacrylate, tris(2-hydroxyethylisocyanurate) triacrylate, di-trimethylolpropane tetraacrylate, dipentaerythritol pentaacrylate, pentaerythritol tetraacrylate, or combinations thereof.

Embodiment 29 is the film of any one of embodiments 25 to 28 wherein the multifunctional (meth)acrylate monomers and/or oligomers comprise 5 wt-% to 30 wt-% multifunctional (meth)acrylate monomers and/or oligomers having a Tg of less than 25° C., based on the total weight of the (meth)acrylates monomers and/or oligomers.

Embodiment 30 is the film of embodiment 29 wherein the multifunctional (meth)acrylate monomers and/or oligomers having a Tg of less than 25° C. comprise ethoxylated(20) trimethylolpropane triacrylate, ethoxylated(15) trimethylolpropane triacrylate, 2(2-ethoxyethoxy) ethyl acrylate, polyethylene glycol(400) diacrylate, polyethylene glycol(600) dimethacrylate, methoxy polyethylene glycol(350) monomethacrylate, propoxylated glyceryl triacrylate, ethoxylated pentaerythritol tetraacrylate, or combinations thereof.

Embodiment 31 is the film of any one of embodiments 24 to 30 wherein the free-radically polymerizable monomers and/or oligomers comprise alkoxysilyl-containing ethylenically unsaturated monomers.

Embodiment 32 is the film of embodiment 31 wherein the free-radically polymerizable monomers and/or oligomers comprise 1 wt-% to 30 wt-% alkoxysilyl-containing ethylenically unsaturated monomers, based on the total weight of the polymerizable material.

Embodiment 33 is the film of embodiment 31 or 32 wherein the alkoxysilyl-containing ethylenically unsaturated monomers comprise compounds of Formulas (I), (II), and (III):

wherein for Formulas (I) and (II):
each R is independently H, —CH$_3$, —C$_2$H$_5$, —C$_3$H$_7$, or —C$_4$H$_9$;
X=CH$_2$ or O; and
n=0 to 10;

wherein for Formula (III):
each R is independently H, —CH₃, —C₂H₅, —C₃H₇, or —C₄H₉;
R¹ is —CH₃ or H;
X═CH₂, O, S, or NHC(O)R²;
R² is independently —C₂H₅, —C₃H₇, or —C₄H₉; and
n=0 to 10.

Embodiment 34 is the film of any one of embodiments 2 to 33 wherein the acrylic hardcoat comprises nanoparticles.

Embodiment 35 is the film of embodiment 34 wherein the nanoparticles comprise aluminum oxide, antimony tin oxide, bismuth subsalicylate, boehmite, calcium carbonate, calcium phosphate, cerium dioxide, graphene, halloysite, lanthanum boride, lithium carbonate, silver, antimony oxide, amorphous silica, colloidal silica, silicon dioxide, titanium dioxide, zinc oxide, zirconium oxide or dioxide, or combinations thereof.

Embodiment 36 is the film of embodiment 35 wherein the nanoparticles comprise silica nanoparticles (amorphous or colloidal).

Embodiment 37 is the film of any one of embodiments 34 to 36 wherein the nanoparticles are surface-modified nanoparticles.

Embodiment 38 is the film of embodiment 37 wherein the surface-modified nanoparticles are surface treated with a compound selected from isooctyl trimethoxy-silane, N-(3-triethoxysilylpropyl) methoxyethoxyethoxyethyl carbamate (PEG3TES), SILQUEST A1230, N-(3-triethoxysilylpropyl) methoxyethoxyethoxyethyl carbamate (PEG2TES), 3-(methacryloyloxy)propyl]trimethoxysilane, 3-acryloxy-propyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate, 2-(2-methoxyethoxy)acetic acid, methoxyphenyl acetic acid, and mixtures of two or more of the foregoing.

Embodiment 39 is the film of any one of embodiments 34 to 38 wherein the nanoparticles are present in an amount of 10 wt-% to 95 wt-%, based on the total weight of the acrylic hardcoat layer.

Embodiment 40 is the film of any one of embodiments 1 to 39 wherein the siliceous primer layer has an average thickness of at least 0.05 micron.

Embodiment 41 is the film of any one of embodiments 1 to 40 wherein e siliceous primer layer has an average thickness of up to 5 microns.

Embodiment 42 is the film of any one of embodiments 1 to 41 wherein the siliceous primer layer comprises silica nanoparticles modified by an organic silane.

Embodiment 43 is the film of embodiment 42 wherein the siliceous primer layer comprises the silica nanoparticles modified by an organic silane in an amount of at least 50 wt-%, based on the total weight of the primer layer.

Embodiment 44 is the film of embodiment 42 or 43 wherein the siliceous primer layer comprises the silica nanoparticles modified by an organic silane in an amount of up to 90 wt-%, based on the total weight of the primer layer.

Embodiment 45 is the film of any one of embodiments 42 to 44 wherein the silica nanoparticles comprise nonporous spherical nanoparticles.

Embodiment 46 is the film of embodiment 45 wherein the nonporous spherical nanoparticles have an average particle size of up to 100 nm.

Embodiment 47 is the film of any one of embodiments 42 to 46 wherein the organic silane comprises one or more epoxy-functional compounds of Formulas (IV), (V), (VI), and (VII):

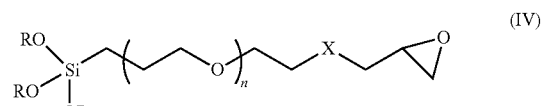

(IV)

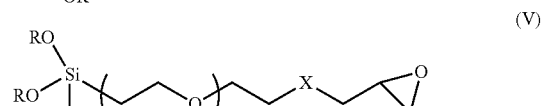

(V)

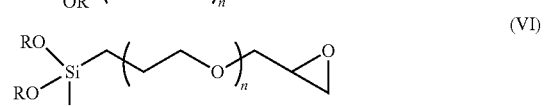

(VI)

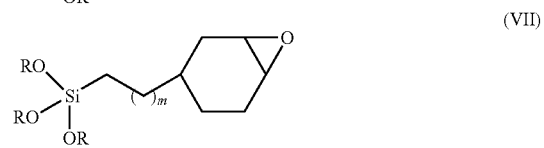

(VII)

wherein:
each R is independently H, —CH₃, —C₂H₅, —C₃H₇, or —C₄H₉;
X═CH₂, O, S, or NHC(O)R¹;
each R¹ is independently —C₂H₅, —C₃H₇, or —C₄H₉;
n=0 to 10; and
m=1 to 4.

Embodiment 48 is the film of any one of embodiments 42 to 46 wherein the organic silane comprises hydroxyl-functional organic silanes selected from the following group.

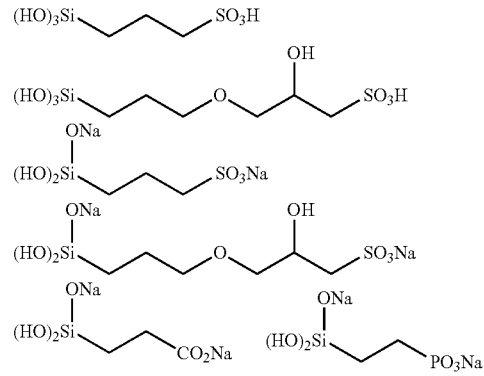

Embodiment 49 is the film of any one of embodiments 42 to 48 wherein the siliceous primer layer further comprises a metal silicate.

Embodiment 50 is the film of embodiment 49 wherein the metal silicate is selected from the group of lithium silicate, sodium silicate, potassium silicate, and combinations thereof.

Embodiment 51 is the film of embodiment 49 or 50 wherein the metal silicate is present in the primer layer in an amount of at least 1 wt-%, based on the total weight of the dried primer layer.

Embodiment 52 is the film of any one of embodiments 49 to 51 wherein the metal silicate is present in the primer layer in an amount of up to 30 wt-%, based on the total weight of the dried primer layer.

Embodiment 53 is the film of any one of embodiments 42 to 52 wherein the siliceous primer layer further comprises a polyvalent metal cation salt.

Embodiment 54 is the film of embodiment 53 wherein the polyvalent metal cation salt comprises a metal cation having a positive charge of at least +2.

Embodiment 55 is the film of embodiment 54 wherein the polyvalent metal cation is selected from the group of aluminum (+3), titanium (+4), vanadium (+3, +4, +5), manganese (+2, +3), zinc (+2), tin (+2, +4), and combinations thereof.

Embodiment 56 is the film of any one of embodiments 53 to 55 wherein the polyvalent metal cation salt is present in the siliceous primer layer in an amount of at least 5 wt-%, based on the total weight of the dried primer layer.

Embodiment 57 is the film of any one of embodiments 53 to 56 wherein the polyvalent metal cation salt is present in the siliceous primer layer in an amount of up to 40 wt-%, based on the total weight of the dried primer layer.

Embodiment 58 is the film of any one of embodiments 42 to 57 wherein the siliceous primer layer is applied from an aqueous primer coating composition having a pH of 5 or less.

Embodiment 59 is the film of embodiment 58 wherein the aqueous primer coating composition comprises nanosilica particles modified by an organic silane in an amount of at least 0.1 wt-%, based on the total weight of the coating composition.

Embodiment 60 is the film of embodiment 58 or 59 wherein the aqueous primer coating composition comprises nanosilica particles modified by an organic silane in an amount of up to 30 wt-%, based on the total weight of the primer coating composition.

Embodiment 61 is the film of any one of embodiments 58 to 60 wherein the aqueous primer coating composition comprises a metal silicate in an amount of at least 0.1 wt-%, based on the total weight of the primer coating composition.

Embodiment 62 is the film of any one of embodiments 58 to 61 wherein the aqueous primer coating composition comprises a metal silicate in an amount of up to 10 wt-%, based on the total weight of the primer coating composition.

Embodiment 63 is the film of any one of embodiments 58 to 61 wherein the aqueous primer coating composition comprises a metal cation salt in an amount of at least 0.1 wt-%, based on the total weight of the primer coating composition.

Embodiment 64 is the film of any one of embodiments 58 to 63 wherein the aqueous primer coating composition comprises a polyvalent metal cation salt in an amount of up to 5 wt-%, based on the total weight of the primer coating composition.

Embodiment 65 is the film of any one of embodiments 58 to 64 wherein the aqueous primer coating composition has a solids content of at least 0.1 wt-%, based on the total weight of the primer coating composition.

Embodiment 66 is the film of any one of embodiments 58 to 65 wherein the aqueous primer coating composition has a solids content of up to 15 wt-%, based on the total weight of the primer coating composition.

Embodiment 67 is the film of any one of embodiments 58 to 66 wherein the aqueous primer coating composition comprises volatile organic solvents in an amount of less than 0.1 wt-%, based on the total weight of the aqueous continuous liquid phase.

Embodiment 68 is the film of any one of embodiments 58 to 67 wherein the aqueous primer coating composition is applied in a uniform average wet thickness varying from 0.5 micron to 50 microns.

EXAMPLES

Objects and advantages of various embodiments of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Unless otherwise noted, all parts, percentages, ratios, etc. in the Examples and the rest of the specification are by weight. Unless otherwise noted, all chemicals used in the examples can be obtained from general chemical suppliers such as, for example, Sigma-Aldrich Corp., Saint Louis, Mo. In the examples, "wt-%" refers to weight percent, "mmol" refers to millimole, and "mol" refers to mole.

Materials

TABLE 1

| Abbreviation | Description; Tradename | Vendor |
| --- | --- | --- |
| NALCO 1115 | Colloidal silica sol, 16.6 wt-%; "NALCO 1115" | Nalco Corp., Naperville, Illinois |
| LSS-35 | Lithium silicate, 23 wt-%; "LSS-35" | Nissan Chemical America Corp., Houston, Texas |
| $Al(NO_3)_3 \cdot 9H_2O$ | Aluminum nitrate 9-hydrate; MW: 375.13 | J. T. Baker, Center Valley, Pennsylvania |
| $Na_2SiO_3 \cdot 9H_2O$ | Sodium meta-silicate 9-hydrate; MW: 284.2 | J. T. Baker, Center Valley, Pennsylvania |
| STAR | Sodium silicate solution, $SiO_2:Na_2O$ = 2.5 (weight ratio), 37.1 wt-%; "STAR" | PQ Corp., Malvern, Pennsylvania |
| D | Sodium silicate solution, $SiO_2:Na_2O$ = 2 (weight ratio), 44.1 wt-%; "D" | PQ Corp., Malvern, Pennsylvania |
| KASIL 1 | Potassium silicate solution, $SiO_2:K_2O$ = 2.5 (weight ratio), 29.1 wt-%; "KASIL 1" | PQ Corp., Malvern, Pennsylvania |

TABLE 1-continued

| Abbreviation | Description; Tradename | Vendor |
|---|---|---|
| KASIL 6 | Potassium silicate solution, $SiO_2:K_2O = 2.1$ (weight ratio), 39.2 wt-%; "KASIL 6" | PQ Corp., Malvern, Pennsylvania |
| Epoxy silane | (3-Glycidoxypropyl)trimethoxysilane, 97 wt-%; MW: 236.34 | Alfa Aesar, Ward Hill, Massachusetts |
| ZS | Zwitterionic silane, 43 wt-% in water | Prepared according to the teachings of U.S. Pat. No. 9,340,683 (Jing et al.) |
| $HNO_3$ | Nitric acid, 68-70 wt-% | BDH, Radnor, Pennsylvania |
| PET film with Hard Coat 1 | White 7-mil (178-micrometer) thick polyethylene terephthalate (PET) coated with 3 micrometer hard coat (SR444/NALCO 2327/A174 = 31/53/16) | Prepared as described below |
| PET film with Hard Coat 2 | White 7-mil (178-micrometer) thick PET coated with 3 micrometer hard coat (SR444/A174 = 75/25) | Prepared as described below |
| MITSUBISHI film | White 7-mil (178-micrometer) thick PET film; "HOSTAPHAN W54B" | Obtained from Mitsubishi Polyester Film, Inc., Greer, South Carolina |

Methods

Preparation of Hard Coated Substrate Films

A hard coated substrate was prepared by coating a hard coat formulation comprising SR444/Nalco 2327/A174=31/53/16 in a weight ratio of =31/53/16 in ethyl acetate solvent onto a MITSUBISHI (7-mil (178-micrometer) white PET film obtained from Mitsubishi Polyester Film, Inc., Greer, S.C., under tradename "HOSTAPHAN W54B") by reverse gravure coating method. The wet coating was dried at 60° C. for 30 seconds by passing the coated film through an oven and subsequently curing the coating composition by passing it through a UV station (obtained from Haraeus Noblelight America, LLC, Gaithersburg, Md.) equipped with a 300 W H-bulb with average UVC energy output of 60 mJ. The coated film was passed through the UV curing system at a rate of 20 fpm (approximately 6.1 m/min) speed. The UV lamp was placed about 1 inch (2.5 cm) above the coated film. The thickness of the resulting hard coat was about 3 micrometers. This is the PET film with Hard Coat 1.

Another hard-coated substrate with Hard Coat 2 was formed in the same manner.

Preparation of Diluted Acidified Nanosilica Solution

NALCO 1115 nanosilica solution was diluted to desired concentration and adjusted to pH around 2 by the addition of $HNO_3$. A sample of 100 grams of 10 wt-% acidified NALCO 1115 solution was prepared by adding 39.76 grams deionized (DI) water into 60.24 grams NALCO 1115 (16.6 wt-%), pH was adjusted to 2 by adding sufficient amount of $HNO_3$. A sample of 100 grams of 7 wt-% acidified NALCO 1115 solution was prepared by adding 57.83 grams DI water into 42.17 grams NALCO 1115, pH was adjusted to 2 by adding sufficient amount of $HNO_3$. A sample of 100 grams of 5 wt-% acidified NALCO 1115 solution was prepared by adding 69.88 grams DI water into 30.12 grams NALCO 1115, pH was adjusted to 2 by adding sufficient amount of $HNO_3$. A sample of 100 grams of 3 wt-% acidified NALCO 1115 solution was prepared by adding 81.93 grams DI water into 18.07 grams NALCO 1115, pH was adjusted to 2 by adding sufficient amount of $HNO_3$.

Preparation of (3-Glycidoxypropyl)trimethoxysilane Modified Nanosilica Solution (0.3 mmol Epoxy Silane Per Gram of Solid NALCO 1115 Solids)

(3-Glycidoxypropyl)trimethoxysilane (3 mmol, 0.709 gram) was introduced into the 100 grams of 10 wt-% acidified NALCO 1115 solution and stirred for about 1 hour in a screw-capped jar at room temperature. The capped jar was heated in a ventilation oven under 60° C. overnight (approximately 16 hours) and the treated NALCO 1115 solution (referred to hereinafter as 10 wt-% NALCO 1115-0.3) was ready.

The same method was applied to prepare 5 wt-% NALCO 1115-0.3 and 3 wt-% NALCO 1115-0.3.

Preparation of (3-Glycidoxypropyl)trimethoxysilane Modified Nanosilica Solution (0.8 mmol Epoxy Silane Per Gram of NALCO 1115 Solids)

(3-Glycidoxypropyl)trimethoxysilane (8 mmol, 1.891 grams) was introduced into the 100 grams of 10 wt-% acidified NALCO 1115 solution and stirred for about 1 hour in a screw-capped jar at room temperature. The capped jar was heated in a ventilation oven under 60° C. overnight (approximately 16 hours) and the treated NALCO 1115 solution (10 wt-% NALCO 1115-0.8) was ready.

The same method was applied to prepare 7 wt-% NALCO 1115-0.8, 5 wt-% NALCO 1115-0.8 and 3 wt-% NALCO 1115-0.8.

Table 2, below is a summary of the description and ingredients for preparing (3-glycidoxypropyl)trimethoxysilane modified nanosilica solutions described above.

TABLE 2

| Designation | Acidified nanosilica | (3-Glycidoxypropyl)trimethoxysilane |
|---|---|---|
| 10 wt-% NALCO 1115-0.3 | 100 grams 10 wt-% NALCO 1115 (pH of approximately 2) | 0.709 gram (3 mmol) |
| 5 wt-% NALCO 1115-0.3 | 100 grams 5 wt-% NALCO 1115 (pH of approximately 2) | 0.355 gram (1.5 mmol) |
| 3 wt-% NALCO 1115-0.3 | 100 grams 3 wt-% NALCO 1115 (pH of approximately 2) | 0.213 gram (0.9 mmol) |
| 10 wt-% NALCO 1115-0.8 | 100 grams 10 wt-% NALCO 1115 (pH of approximately 2) | 1.891 grams (8 mmol) |
| 7 wt-% NALCO 1115-0.8 | 100 grams 7 wt-% NALCO 1115 (pH of approximately 2) | 1.324 grams (5.6 mmol) |
| 5 wt-% NALCO 1115-0.8 | 100 grams 5 wt-% NALCO 1115 (pH of approximately 2) | 0.945 gram (4 mmol) |

TABLE 2-continued

| Designation | Acidified nanosilica | (3-Glycidoxypropyl)tri-methoxysilane |
|---|---|---|
| 3 wt-% NALCO 1115-0.8 | 100 grams 3 wt-% NALCO1115 (pH of approximately 2) | 0.567 gram (2.4 mmol) |

Preparation of 10 wt-% Inorganic Primer Coating Solution

In a 20-mL capped vial, 10 grams of a primer coating solution containing 10 wt-% NALCO 1115-0.3/LSS-35/Al(NO$_3$)$_3$=81/9/10 (referred to hereinafter as NP-10-1) was prepared by mixing 8.1 grams of 10 wt-% NALCO 1115-0.3 and 0.9 gram of 10 wt-% LSS-35 first, then tuning the pH to around 2 by adding HNO$_3$, then introducing 1 gram of 10 wt-% solution of Al(NO$_3$)$_3$. Finally, the pH of primer coating solution was adjusted to 2 by adding sufficient amount of HNO$_3$.

The same method was applied to prepare primer coating solutions NP-10-2, NP-10-3 and NP-10-4 except that the components were varied as summarized in Table 3, below.

Preparation of 7 wt-% Inorganic Primer Coating Solution

In a 20-mL capped vial, 10 grams of 7 wt-% NALCO 1115-0.8/Na$_2$SiO$_3$/Al(NO$_3$)$_3$=72/8/20 (referred to hereinafter as NP-7-1) was prepared by mixing 7.2 grams of 7 wt-% NALCO 1115-0.8 and 0.8 gram of 7 wt-% Na$_2$SiO$_3$ first, then tuning the pH to around 2 by adding HNO$_3$, then introducing 2 grams of 7 wt-% solution of Al(NO$_3$)$_3$. Finally, the pH of primer coating was adjusted to 2 by adding sufficient amount of HNO$_3$.

Preparation of 5 wt-% Inorganic Primer Coating Solution

In a 20-mL capped vial, 10 grams of 5 wt-% NALCO 1115-0.3/LSS-35/Al(NO$_3$)$_3$=72/8/20 (referred to hereinafter as NP-5-1) was prepared by mixing 7.2 grams of 5 wt-% NALCO 1115-0.3 and 0.8 gram of 5 wt-% LSS-35 first, then tuning the pH to around 2 by adding HNO$_3$, then introducing 2 grams of 5 wt-% Al(NO$_3$)$_3$. Finally, the pH of primer coating was adjusted to 2 by adding sufficient amount of HNO$_3$.

The same method was applied to prepare primer coating solution NP-5-2 except that the components were varied as summarized in Table 3, below.

Preparation of 3 wt-% Inorganic Primer Coating Solution

In a 20-mL capped vial, 10 grams of 3 wt-% NALCO 1115-0.3/LSS-35/Al(NO$_3$)$_3$=72/8/20 (referred to hereinafter NP-3-1) was prepared by mixing 7.2 grams of 3 wt-% NALCO 1115-0.3 and 0.8 gram of 3 wt-% LSS-35 first, pH was tuned to around 2 by HNO$_3$, then introducing 2 grams of 3 wt-% Al(NO$_3$)$_3$. Finally, the pH of primer coating was adjusted to 2 by HNO$_3$.

The same method was applied to prepare primer coating solutions NP-3-2, NP-3-3, NP-3-4, NP-3-5, NP-3-6, NP-3-7 and NP-3-8 except that the components were varied as summarized in Table 3, below.

Preparation of Control Inorganic Primer Coating Solution (NP-CB)

In a 20-mL capped vial, 10 grams of 3 wt-% NALCO 1115-0.8/LSS-35=72/8 (referred to hereinafter as NP-CB) was prepared by mixing 7.2 grams of 3 wt-% NALCO 1115-0.8 and 0.8 gram of 3 wt-% LSS-35, then tuning the pH to around 2 by adding HNO$_3$ as summarized in Table 3, below.

Preparation of Control Inorganic Primer Coating Solution (NP-CC)

In a 20-mL capped vial, 10 grams of 3 wt-% NALCO 1115-0.8/Al(NO$_3$)$_3$=72/20 (referred to herein after NP-CC) was prepared by mixing 7.2 grams of 3 wt-% NALCO 1115-0.8 and 2 grams of 3 wt-% Al(NO$_3$)$_3$, and then tuning the pH to around 2 by HNO$_3$ as summarized in Table 3, below.

TABLE 3

| Designation | Components | Weight ratio | Solution wt-% | Stability |
|---|---|---|---|---|
| NP-10-1 | NALCO 1115-0.3/LSS-35/Al(NO$_3$)$_3$ | 81/9/10 | 10 | Gel after 10 days |
| NP-10-2 | NALCO 1115-0.3/LSS-35/Al(NO$_3$)$_3$ | 72/8/20 | 10 | Gel after 10 days |
| NP-10-3 | NALCO 1115-0.8/LSS-35/Al(NO$_3$)$_3$ | 72/8/20 | 10 | Gel after 53 days |
| NP-10-4 | NALCO 1115-0.8/Na$_2$SiO$_3$/Al(NO$_3$)$_3$ | 72/8/20 | 10 | Gel after 4 months |
| NP-7-1 | NALCO 1115-0.8/Na$_2$SiO$_3$/Al(NO$_3$)$_3$ | 72/8/20 | 7 | Did not gel >4 months |
| NP-5-1 | NALCO 1115-0.3/LSS-35/Al(NO$_3$)$_3$ | 72/8/20 | 5 | Gel after 3 months |
| NP-5-2 | NALCO 1115-0.8/Na$_2$SiO$_3$/Al(NO$_3$)$_3$ | 72/8/20 | 5 | Did not gel >4 months |
| NP-3-1 | NALCO 1115-0.3/LSS-35/Al(NO$_3$)$_3$ | 72/8/20 | 3 | Did not gel >4 months |
| NP-3-2 | NALCO 1115-0.8/LSS-35/Al(NO$_3$)$_3$ | 72/8/20 | 3 | Did not gel >4 months |
| NP-3-3 | NALCO 1115-0.8/LSS-35/Al(NO$_3$)$_3$ | 64/16/20 | 3 | Did not gel >4 months |
| NP-3-4 | NALCO 1115-0.8/Na$_2$SiO$_3$/Al(NO$_3$)$_3$ | 72/8/20 | 3 | Did not gel >4 months |
| NP-3-5 | NALCO 1115-0.8/Na$_2$SiO$_3$/Al(NO$_3$)$_3$ | 64/16/20 | 3 | Did not gel >4 months |
| NP-3-6 | NALCO 1115-0.8/D/Al(NO$_3$)$_3$ | 76/4/20 | 3 | Did not gel >4 months |
| NP-3-7 | NALCO 1115-0.8/KASIL 1/Al(NO$_3$)$_3$ | 76/4/20 | 3 | Did not gel >4 months |
| NP-3-8 | NALCO 1115-0.8/KASIL 6/Al(NO$_3$)$_3$ | 76/4/20 | 3 | Did not gel >4 months |
| NP-CA | NALCO 1115-0.8 | | 3 | Did not gel >4 months |
| NP-CB | NALCO 1115-0.8/LSS-35 | 72/8 | 3 | Did not gel >4 months |
| NP-CC | NALCO 1115-0.8/Al(NO$_3$)$_3$ | 72/20 | 3 | Did not gel >4 months |

Preparation of Hydrophilic Top Coating Solution

In a screw-capped jar was added 8.14 grams of zwitterionic silane (43 wt-%), 6.52 grams of LSS-35 (23 wt-%) and 85.34 grams of DI water. The weight ratio between zwitterionic silane and LSS-35 was 70 to 30, and the total weight percentage of the components was 5 wt-%.

The same procedure was used to prepare 5 wt-% zwitterionic silane/LSS-35 (30/70), 3 wt-% zwitterionic silane/LSS-35 (40/60), 3 wt-% zwitterionic silane/LSS-35 (30/70), 1 wt-% zwitterionic silane/LSS-35 (40/60), 1 wt-% zwitterionic silane/STAR (40/60), 1 wt-% zwitterionic silane/STAR(30/70), and 1 wt-% zwitterionic silane/KASIL 6 (40/60).

Preparation of Hard Coated PET Film Method I

Coated samples were prepared as following procedure:

In a first step, an inorganic primer coating (prepared as described above) was applied on the substrate film (i.e., MITSUBISHI film or PET film with hard coat thereon) by using Mayer rod (#12 or #6), then thermally curing in ventilation oven (set at 120° C. to 160° C.) for about 3-5 minutes.

Then, in a second step, hydrophilic coating solution (prepared as described above in the "Preparation of Hydrophilic Top Coating Solution") was coated over cured nanosilica primer layer by Mayer rod (#12 or #6), then thermally cured in ventilation oven (120° C. to 160° C.) for 3-5 minutes.

Preparation of Hard Coated PET Film Method II

Primer coatings were applied on PET film with Hard Coat 1 using a YASUI SEIKI conventional roller (Gravure) coater (from Yasui Seiki, Bloomington, Ind.). The rollers were 6 inches (15 cm) wide, and the coating was applied at 10 feet per minute (fpm) (3 meters per minute) rate. The primer coating was cured at 140° C. for 1 minute.

Then, the hydrophilic coatings were applied in the same manner as the primer coating, cured at 140° C. for 1 minute. Following this, the hydrophilic coated films were further cured in ventilation oven for another 5 minutes at 140° C.

Note that the nanosilica primer coatings formed on the hard coated PET films were cured twice through the coater oven before the hydrophilic coating was applied.

Mechanical Durability and Easy-Clean Evaluation Test

The coating durability was evaluated by wet reciprocating abrasion test (100 cycles or more) using a Taber Industries 5900 Reciprocating Abraser (form Taber Industries, North Tonawanda, N.Y.) under 10.0 Newtons load, 75 cycles per minute and a stroke length of 5.1 centimeter. The 2.5 centimeter button was covered with a KIMBERLY-CLARK L30 or L40 WYPALL towel and an abrasion square cloth (AATCC Crockmeter Standard Rubbing Cloth from Testfabrics, Inc., West Pittston, Pa.). The square cloth (which touched the coating surface) was wetted by deionized water during the abrasion test.

If the coating was durable to pass the abrasion test (i.e., no scratches), the abrasion area was marked by a permanent marker, the inks were left over the surface for a certain period of time for easy-clean aging test (16 hours to >100 hours). Marker inks were removed by wet KIMWIPE tissue rubbing to check for any ink residues were left or the coating was scratched. If no obvious ink residues existed, the coating was deemed to have exhibited very good easy-clean function and durability.

The following permanent markers were used for testing: AVERY MARKS-A-LOT PERMANENT MARKERS (black, red); BIC MARK IT FINE POINT PERMANENT MARKER (black, blue, red); SHARPIE FINE POINT PERMANENT MARKER (black, blue, red).

Comparative Examples (Control CA to Control CC)

Comparative Examples Control CA to Control CC were prepared by following the methods described above in "Preparation of (3-Glycidoxypropyl)trimethoxysilane Modified Nanosilica Solution," "Preparation of Control Inorganic Primer Coating Solution (NP-CB)," "Preparation of Control Inorganic Primer Coating Solution (NP-CC)," "Preparation of Hydrophilic Top Coating Solution" and "Preparation of Hard Coat Primed PET Film Method I" The purpose was to examine the performance of primer coating containing only silane modified nanosilica (NP-CA), silane modified nanosilica and silicate (NP-CB) or silane modified nanosilica and metal salts (NP-CC) for mechanical durability and easy-clean function. The Control CA to Control CC films were evaluated by following the method described in "Mechanical Durability and Easy-Clean Evaluation Test," the cycles were 5000 and the inks were left over the abrasion area for over 16 hours at room temperature for control CC. The results are shown in Table 4.

It is noted that in Table 4, hydrophilic coating was not applied over primer coating NP-CA for Control CA sample due to crystallization formed by cured primer coating. Similar situation was met when hydrophilic coating was applied and cured over primer coating NP-CB for control CB. Ghost image was shown after permanent marker inks were left over the abrasion area for 16 hours of control CC.

TABLE 4

| Example | Primer Coating | Hydrophilic Coating | 5000 cycles, 16 hours |
|---|---|---|---|
| Control CA | NP-CA | Not applied | Crystals formed after primer coating was cured |
| Control CB | NP-CB | 1 wt % Zwitterionic silane/LSS-35(40/60) | Crystals formed after coatings were cured |
| Control CC | NP-CC | 1 wt-% Zwitterionic silane/LSS-35(40/60) | Ghost image |

Examples 1-6

Examples 1-6 were prepared by following methods described in "Preparation of (3-Glycidoxypropyl)trimethoxysilane Modified Nanosilica Solution," "Preparation of 10 wt-% Inorganic Primer Coating Solution," "Preparation of 5 wt-% Inorganic Primer Coating Solution," "Preparation of 3 wt-% Inorganic Primer Coating Solution," "Preparation of Hydrophilic Top Coating Solution" and "Preparation of Hard Coat Primed PET Film—Method I" MITSUBISHI film was used as substrate to prepare Examples 1-6. The samples were coated using a Mayer rod #12. The samples were cured at different temperatures, but the nanosilica primer coating and hydrophilic coating were cured under the same thermal condition (temperature and curing time). A sample of 5 wt-% zwitterionic silane/LSS-35 (70/30) was used as hydrophilic coating for Examples 1-6. The sample films were evaluated by following "Mechanical Durability and Easy-Clean Evaluation Test." The durability was evaluated after 100 cycles reciprocating abrasion test, if the coatings passed the abrasion test, the permanent marker inks were left over the abrasion area overnight (about 16 hours) or longer before rubbing off the inks by wet KIMWIPE tissues. The results of Example 1-6 are shown in Table 5.

TABLE 5

| Example | Nanosilica Primer | Abrasion test (after 100 cycles) after curing at | | | |
|---|---|---|---|---|---|
| | | 160° C. | 150° C. | 140° C. | 130° C. |
| Example 1 | NP-10-1 | Durable and ghost free | Not durable | Some ghost ink | n/a |
| Example 2 | NP-10-2 | n/a | Durable and ghost free | Ghost ink | Ghost ink |
| Example 3 | NP-10-3 | n/a | Durable and ghost free * | n/a | Ghost ink * |
| Example 4 | NP-5-1 | n/a | Durable and ghost free (little mark) | | Ghost ink * |

TABLE 5-continued

| Example | Nanosilica Primer | Abrasion test (after 100 cycles) after curing at | | | |
|---|---|---|---|---|---|
| | | 160° C. | 150° C. | 140° C. | 130° C. |
| Example 5 | NP-3-1 | n/a | Durable and ghost free | Some marks | Some marks |
| Example 6 | NP-3-2 | n/a | Durable and ghost free * | n/a | Durable and ghost free * | n/a means that the sample was not tested.
Not durable means sample failed the abrasion test (i.e., the coatings showed scratches or peeling-off from the film after reciprocating abrasion).
"Durable and ghost free" means sample passed the abrasion test and were durable. After rubbing off the inks after the inks were left over the surface for overnight, no obvious ink residues existed.
"Ghost ink" means after wet rubbing, some inks were still on/inside the coating, which looked like ghost image.
"Some marks" meant some ink spots were not able to be rubbed off by wet tissues.
* Permanent marker inks were left over the surface over the weekend (about 64 hours).

The film of Example 6 exhibited good durability and easy-clean property after thermally curing at as low as 130° C. Based on these results, the Example 6 films (which was formed using nanosilica primer coating with 3 wt-% NALCO 1115-0.8/LSS-35/Al(NO$_3$)$_3$ (72/8/20)) were further evaluated after thermal curing at 120° C. and 130° C. The durability was evaluated after 500 or 1000 cycles of reciprocating abrasion test and the permanent marker inks were left over the abrasion area for overnight (16 hours). Even after 1000 cycles of reciprocating abrasion, the Example 6 films still exhibited excellent durability and easy-clean properties. The additional test data for Example 6 is shown in Table 6, below.

TABLE 6

| Example | Nanosilica Primer | Abrasion test after curing at | | | |
|---|---|---|---|---|---|
| | | 130° C. (after 500 cycles) | 130° C. (after 1000 cycles) | 120° C. (after 500 cycles) | 120° C. (after 1000 cycles) |
| Example 6 | NP-3-2 | Durable and ghost free | Durable and ghost free | Durable and ghost free | Durable and ghost free |

Examples 7-10

Examples 7-10 were prepared by following methods described in "Preparation of (3-Glycidoxypropyl)trimethoxysilane Modified Nanosilica Solution," "Preparation of 10 wt-% Inorganic Primer Coating Solution," "Preparation of 7 wt-% Inorganic Primer Coating Solution," "Preparation of 5 wt-% Inorganic Primer Coating Solution," "Preparation of 3 wt-% Inorganic Primer Coating Solution," "Preparation of Hydrophilic Top Coating Solution" and "Preparation of Hard Coat Primed PET Film—Method I" MITSUBISHI film was used to prepare Examples 7-10, and the samples were coated via Mayer rod #12. The samples were cured at different temperatures, but the nanosilica primer coating and hydrophilic coating were cured under the same thermal conditions (temperature and curing time). A sample of 5 wt-% zwitterionic silane/LSS-35(70/30) was used as hydrophilic coating for Examples 7-10. The sample films were evaluated by following "Mechanical Durability and Easy-Clean Evaluation Test." The durability was evaluated by 100 cycles reciprocating abrasion test, if the coating passed the abrasion test, the permanent marker inks were left over the abrasion area for about 64 hours before rubbing off the inks by wet KIMWIPE tissues. The results of Examples 7-10 are shown in Table 7.

TABLE 7

| Name | Nanosilica Primer | Abrasion test (after 100 cycles) after curing at | |
|---|---|---|---|
| | | 150° C. | 130° C. |
| Example 7 | NP-10-4 | Durable and ghost free | Durable and ghost free |
| Example 8 | NP-7-1 | Durable and ghost free | Durable and ghost free |
| Example 9 | NP-5-2 | Durable and ghost free | Durable and ghost free |
| Example 10 | NP-3-4 | Durable and ghost free | Durable and ghost free |

Examples 11-12

Examples 11-12 were prepared by following methods described in "Preparation of (3-Glycidoxypropyl)trimethoxysilane Modified Nanosilica Solution," "Preparation of 3 wt-% Inorganic Primer Coating Solution," "Preparation of Hydrophilic Top Coating Solution" and "Preparation of Hard Coat Primed PET Film Method II." PET film with Hard Coat 1 (SR444/2327/A174=31/53/16) was used to prepare Examples 11 and 12. A sample of 5 wt-% zwitterionic silane/LSS-35(70/30) was used as the hydrophilic coating for Examples 11 and 12. Both the primer coating and hydrophilic coating layers were applied using a Gravure Roll #110 resulting in wet coating thickness of about 6-13 micrometers, respectively. The sample films were evaluated by following the "Mechanical Durability and Easy-Clean Evaluation Test." The durability was evaluated after up to 5000 reciprocating cycles, and the permanent marker inks were left over the surface for either 32 or 104 hours. The results of Examples 11 and 12 are shown in Table 8.

TABLE 8

| Name | Nanosilica Primer | Abrasion test after | | | | | |
|---|---|---|---|---|---|---|---|
| | | 1000 cycles | 1500 cycles | 2000 cycles | 3000 cycles | 4000 cycles | 5000 cycles |
| Example 11 | NP-3-3 | 32 hours: fine marks** | 104 hours: stain** | 104 hours: Durable and ghost free | 104 hours: Durable and ghost free | 104 hours: fine marks | 104 hours: fine marks |
| Example 12 | NP-3-5 | 104 hours: Durable and ghost free | 104 hours: Durable and ghost free | 104 hours: Durable and ghost free | 104 hours: Durable and ghost free | 104 hours: Durable and ghost free | 104 hours: Durable and ghost free |

"Some marks" meant some ink spots were not able to be rubbed off by wet tissues.
**Maybe due to coating defects.

Examples 13-21

Examples 13-21 were prepared by following methods described in "Preparation of (3-Glycidoxypropyl)trimethoxysilane Modified Nanosilica Solution," "Preparation of 3 wt-% Inorganic Primer Coating Solution," "Preparation of Hydrophilic Top Coating Solution" and "Preparation of Hard Coat Primed PET Film Method I" PET film with Hard Coat 2 (SR444/A174=75/25) was used to prepare Examples 13-21. Various primer coatings and hydrophilic coatings were used to prepare Examples 13-21 as summarized in Table 9, below. Nanosilica primer coating and hydrophilic coating were coated via #6 Mayer rod, and thermal-cured under 140° C. for 3 minutes for each coating. The sample films were evaluated by following "Mechanical Durability and Easy-Clean Evaluation Test." The samples retained excellent durability after 5000 cycles reciprocating abrasion and no obvious inks residues were identified after 100 hours.

TABLE 9

| Example | Nanosilica Primer | Hydrophilic Coating | Abrasion test after 5000 cycles, 100 hours |
|---|---|---|---|
| Example 13 | NP-3-2 | 3 wt-% Zwitterionic silane/LSS-35 (40/60) | Durable and ghost free |
| Example 14 | NP-3-4 | 3 wt-% Zwitterionic silane/LSS-35 (30/70) | Durable and ghost free |
| Example 15 | NP-3-2 | 1 wt-% Zwitterionic silane/LSS-35 (40/60) | Durable and ghost free |
| Example 16 | NP-3-2 | 1 wt-% Zwitterionic silane/STAR (40/60) | Durable and ghost free |
| Example 17 | NP-3-2 | 1 wt-% Zwitterionic silane/STAR (30/70) | Durable and ghost free |
| Example 18 | NP-3-2 | 1 wt-% Zwitterionic silane/KASIL 6 (40/60) | Durable and ghost free |
| Example 19 | NP-3-6 | 1 wt-% Zwitterionic silane/STAR (30/70) | Durable and ghost free |
| Example 20 | NP-3-7 | 1 wt-% Zwitterionic silane/LSS-35 (40/60) | Durable and ghost free |
| Example 21 | NP-3-8 | 1 wt-% Zwitterionic silane/LSS-35 (40/60) | Durable and ghost free |

Examples 22-24

Examples 22-24 were prepared by following methods described in "Preparation of (3-Glycidoxypropyl)trimethoxysilane Modified Nanosilica Solution," "Preparation of 3 wt-% Inorganic Primer Coating Solution," "Preparation of Hydrophilic Top Coating Solution" and "Preparation of Hard Coat Primed PET Film—Method II" PET film with Hard Coat 1 (SR444/2327/A174=31/53/16) was used to prepare Examples 22-24. The nanosilica primer coating was NP-3-2, 3 wt-% NALCO 1115-0.8/LSS-35/Al(NO$_3$)$_3$=72/8/20, and the hydrophilic coating was 1% zwitterionic silane/LSS-35 (40/60). The thickness of hydrophilic coating in Examples 22, 23, and 24 was varied: Example 22 had the thinnest hydrophilic coating, and Example 24 had the thickest hydrophilic coating as summarized in Table 10, below. The sample films were evaluated by following "Mechanical Durability and Easy-Clean Evaluation Test." The samples retained excellent durability after 5000 cycles reciprocating abrasion and no obvious inks residues were identified after 100 hours.

TABLE 10

| Example | Nanosilica Primer | | Hydrophilic coating | | Abrasion testing after 5000 cycles, 100 hours |
|---|---|---|---|---|---|
| | Gravure Roll # | Nanosilica Primer wet thickness (micrometer) | Gravure Roll # | Hydrophilic Coating wet thickness (micrometer) | |
| Example 22 | 180 | 3-8 | 180 | 3-8 | Durable and ghost free |
| Example 23 | 180 | 3-8 | 110 | 6-13 | Durable and ghost free |
| Example 24 | 180 | 3-8 | 70 | 16-25 | Durable and ghost free |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A film comprising:
    an organic polymeric substrate having a first major surface and a second major surface;
    an optional acrylic hardcoat layer disposed on the first major surface of the substrate;
    a siliceous primer layer disposed on the organic polymeric substrate or on the optional acrylic hardcoat layer, wherein the siliceous primer layer comprises silica nanoparticles modified by an organic silane and a polyvalent metal cation salt; and
    a superhydrophilic surface layer disposed on the siliceous primer layer, wherein the superhydrophilic surface layer comprises hydrophilic-functional groups.

2. The film of claim 1 wherein the acrylic hardcoat layer is disposed on the first major surface of the substrate and the siliceous primer layer is disposed on the acrylic hardcoat layer.

3. The film of claim 2 wherein the acrylic hardcoat layer comprises alkoxysilyl groups.

4. The film of claim 2 wherein the acrylic hardcoat layer is prepared from free-radically polymerizable monomers and/or oligomers.

5. The film of claim 4 wherein the free-radically polymerizable monomers and/or oligomers comprise multifunctional (meth)acrylate monomers and/or oligomers.

6. The film of claim 5 wherein the free-radically polymerizable monomers and/or oligomers further comprise alkoxysilyl-containing ethylenically unsaturated monomers.

7. The film of claim 6 wherein the free-radically polymerizable monomers and/or oligomers comprise 1 wt-% to 30 wt-% alkoxysilyl-containing ethylenically unsaturated monomers, based on the total weight of the polymerizable material.

8. The film of claim 2 wherein the acrylic hardcoat layer is non-tacky and has a Tg of at least 40° C.

9. The film of claim 1 wherein the siliceous primer layer comprises the silica nanoparticles modified by an organic silane in an amount of 50 wt-% to 90 wt-%, based on the total weight of the primer layer.

10. The film of claim 9 wherein the organic silane comprises one or more epoxy-functional compounds of Formulas (IV), (V), (VI), and (VII):

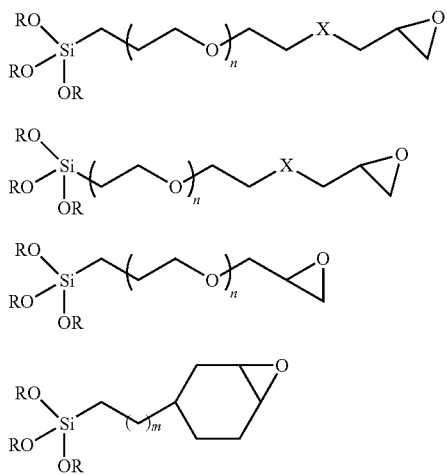

wherein:
each R is independently H, —CH$_3$, —C$_2$H$_5$, —C$_3$H$_7$, or —C$_4$H$_9$;
X=CH$_2$, O, S, or NHC(O)R$^1$;
each R$^1$ is independently —C$_2$H$_5$, —C$_3$H$_7$, or —C$_4$H$_9$;
n=0 to 10; and
m=1 to 4.

11. The film of claim 1 wherein the siliceous primer layer further comprises a metal silicate.

12. The film of claim 11 wherein the metal silicate is present in an amount of at least 1 wt-% and up to 30 wt-%, based on the total weight of the dried primer layer.

13. The film of claim 1 wherein the siliceous primer layer comprises a polyvalent metal cation salt selected from the group of aluminum (+3), titanium (+4), vanadium (+3, +4, or +5), manganese (+2 or +3), zinc, (+2), tine (+2 or +3), and combinations thereof.

14. The film of claim 1 wherein the polyvalent metal cation salt is present in an amount of at least 5 wt-% and up to 40 wt-%, based on the total weight of the dried primer layer.

15. The film of claim 11 wherein the siliceous primer layer is applied from an aqueous primer coating composition comprising:
 nanosilica particles modified by an organic silane in an amount of at least 0.1 wt-% and up to 30 wt-%, based on the total weight of the primer coating composition;
 a metal silicate in an amount of at least 0.1 wt-% and up to 10 wt-%, based on the total weight of the primer coating composition; and
 a metal cation salt in an amount of at least 0.1 wt-% and up to 5 wt-%, based on the total weight of the primer coating composition.

* * * * *